US012275284B2

(12) United States Patent
Dwyer et al.

(10) Patent No.: US 12,275,284 B2
(45) Date of Patent: Apr. 15, 2025

(54) RAIL GEAR ASSEMBLY

(71) Applicant: Cranemasters, Inc., North Chesterfield, VA (US)

(72) Inventors: Thomas Dwyer, Richmond, VA (US); Britt Calloway, Midlothian, VA (US); Barry Isringhausen, Providence Forge, VA (US)

(73) Assignee: Cranemasters, Inc., North Chesterfield, VA (US)

( * ) Notice: Subject to any disclaimer, the term of this patent is extended or adjusted under 35 U.S.C. 154(b) by 847 days.

(21) Appl. No.: 17/601,218

(22) PCT Filed: Apr. 24, 2020

(86) PCT No.: PCT/US2020/029915
§ 371 (c)(1),
(2) Date: Oct. 4, 2021

(87) PCT Pub. No.: WO2020/219947
PCT Pub. Date: Oct. 29, 2020

(65) Prior Publication Data
US 2022/0161620 A1    May 26, 2022

Related U.S. Application Data

(60) Provisional application No. 62/839,409, filed on Apr. 26, 2019.

(51) Int. Cl.
*B60F 1/04* (2006.01)
*B61D 15/00* (2006.01)
*B61D 15/02* (2006.01)

(52) U.S. Cl.
CPC ................ *B60F 1/04* (2013.01); *B60F 1/043* (2013.01); *B61D 15/00* (2013.01); *B60F 2301/04* (2013.01); *B61D 15/02* (2013.01)

(58) Field of Classification Search
CPC ........ B60F 1/04; B60F 2301/04; B60F 1/043; B60F 1/005; B61D 15/02; B61D 15/00
(Continued)

(56) References Cited

U.S. PATENT DOCUMENTS 3,351,037 A * 11/1967 Meili .................. B62D 53/005
                                                                     180/41
5,186,109 A *  2/1993 Madison ............... B60F 1/005
                                                                     105/72.2
(Continued)

FOREIGN PATENT DOCUMENTS

WO       2017/150987 A1    9/2017

OTHER PUBLICATIONS

International Search Report and Written Opinion of the International Searching Authority in International Application No. PCT/US2020/029915, mailed Jul. 1, 2020, 6 pages.

*Primary Examiner* — Zachary L Kuhfuss
(74) *Attorney, Agent, or Firm* — Sterne, Kessler, Goldstein & Fox P.L.L.C.

(57) ABSTRACT

A rail gear assembly includes a base, a first wheel arm, and a second wheel arm. The first wheel arm may have a first end pivotally coupled to the base at a first arm connection and may have a second end rotatably connected to a first wheel by a first axle. The second wheel arm may have a first end pivotally coupled to the base at a second arm connection and a second end rotatably connected to a second wheel by a second axle. The second axle may be independent of the first axle. The rail gear assembly may include actuators that move the first wheel arm and second wheel arm between retracted positions and extended positions. The actuators may permit adjustment of the first wheel arm and the second wheel arm in their respective extended positions such that a (Continued)

net adjustment of the first wheel arm and the second wheel arm with respect to the base is approximately zero.

13 Claims, 14 Drawing Sheets

(58) Field of Classification Search
USPC .............................................. 105/215.2, 72.2
See application file for complete search history.

(56) References Cited

U.S. PATENT DOCUMENTS

| | | | |
|---|---|---|---|
| 5,660,115 A * | 8/1997 | Shimon | B60F 1/005 |
| | | | 105/72.2 |
| 5,756,903 A * | 5/1998 | Norby | B60F 1/005 |
| | | | 73/146 |
| 6,298,792 B1 | 10/2001 | Jackson, Jr. | |
| 2017/0151847 A1* | 6/2017 | Letukas | B60F 1/04 |
| 2018/0370309 A1* | 12/2018 | Hazrati-Ashtiani | B60F 1/02 |
| 2021/0061035 A1* | 3/2021 | Monroe | B61D 15/00 |
| 2021/0086574 A1* | 3/2021 | Monroe | B60F 1/043 |

\* cited by examiner

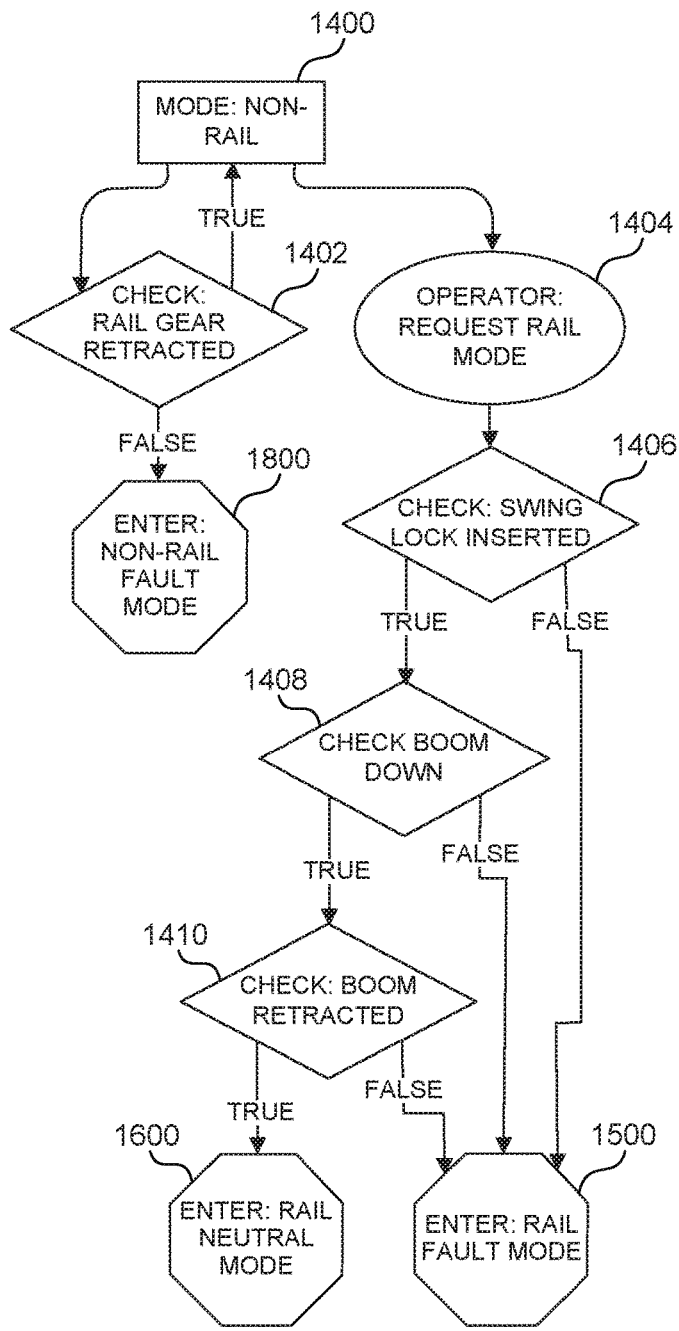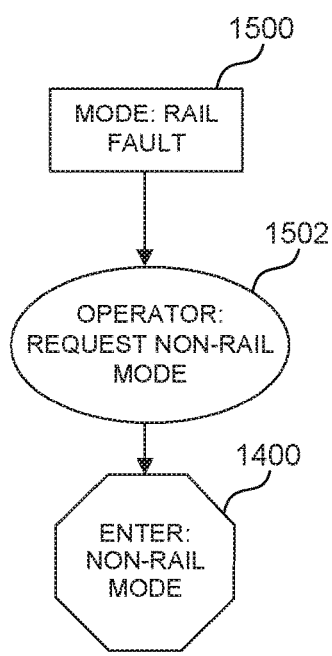
FIG. 14
FIG. 15

RAIL GEAR ASSEMBLY

FIELD

The present disclosure relates to rail gear assemblies. In particular, embodiments relate to vehicle-mounted rail gear assemblies for rail travel.

BACKGROUND

Rail gear assemblies may be used to allow a vehicle to travel on the track of a railway. Some rail gear assemblies may be extendable and retractable and may be mounted on a vehicle having, for example, tires such that the vehicle is capable of both rail travel and non-rail travel.

BRIEF SUMMARY

In some embodiments, a rail gear assembly includes a base, a first wheel arm, and a second wheel arm. The first wheel arm may have a first end pivotally coupled to the base at a first arm connection and may have a second end rotatably connected to a first wheel by a first axle. The second wheel arm may have a first end pivotally coupled to the base at a second arm connection and a second end rotatably connected to a second wheel by a second axle. In some embodiments, the second axle is independent of the first axle. In some embodiments, the rail gear assembly further includes a first wheel arm actuator and a second wheel arm actuator. The first wheel arm actuator may have a first end coupled to the base and a second end coupled to the first wheel arm such that the first wheel arm actuator may move the first wheel arm between a retracted position and an extended position. The second wheel arm actuator may have a first end coupled to the base and a second end coupled to the second wheel arm such that the second wheel arm actuator may move the second wheel arm between a retracted position and an extended position.

In some embodiments, the first wheel arm actuator and the second wheel arm actuator permit adjustment of the first wheel arm and the second wheel arm in their respective extended positions such that a net adjustment of the first wheel arm and the second wheel arm with respect to the base is approximately zero. In some embodiments, the first wheel arm actuator is fluidly connected to the second wheel arm actuator such that the adjustment of the first wheel arm and the second wheel arm in their respective extended positions is accomplished by fluid transfer between the first wheel arm actuator and the second wheel arm actuator.

In some embodiments, the first wheel arm further includes a movable locking pin extending into a locking pin receptacle on the second wheel arm. In some embodiments, the rail gear assembly further includes a hydraulic motor to drive the first wheel. In some embodiments, the rail gear assembly further includes a rail gauge member. The rail gauge member may have a first end pivotally coupled to the first wheel arm and a second end pivotally coupled to the second wheel arm to maintain a gauge between the first wheel and the second wheel.

In some embodiments, a method of controlling a rail gear assembly includes lowering a first wheel arm from a retracted position to an extended position. In some embodiments, the first wheel arm has a first end pivotally coupled to a base at a first arm connection and a second end rotatably connected to a first wheel by a first axle. In some embodiments, a first wheel arm actuator having a first end coupled to the base and a second end coupled to the first wheel arm lowers the first wheel arm from the retracted position to the extended position. In some embodiments, the method of controlling a rail gear assembly further includes lowering a second wheel arm from a retracted position to an extended position. In some embodiments, the second wheel arm has a first end pivotally coupled to the base at a second arm connection and a second end rotatably connected to a second wheel by a second axle. In some embodiments, a second wheel arm actuator having a first end coupled to the base and a second end coupled to the second wheel arm lowers the second wheel arm from the retracted position to the extended position. In some embodiments, the second axle is independent of the first axle. In some embodiments, the first wheel arm and the second wheel arm move from their respective retracted positions to their respective extended positions simultaneously. In some embodiments, the method of controlling a rail gear assembly further includes verifying that the first and second wheel arms are in the extended position.

In some embodiments, the method of controlling a rail gear assembly further includes allowing adjustment of the first wheel arm and the second wheel arm in their respective extended positions such that a net adjustment of the first wheel arm and the second wheel arm with respect to the base is approximately zero. In some embodiments, the first wheel arm actuator is fluidly connected to the second wheel arm actuator such that the adjustment of the first wheel arm and the second wheel arm in their respective extended positions is accomplished by fluid transfer between the first wheel arm actuator and the second wheel arm actuator. In some embodiments, the adjustment of the first wheel arm and the second wheel arm is accomplished automatically with an adjustment control system.

In some embodiments, the first wheel arm further includes a movable locking pin that extends into a locking pin receptacle on the second wheel arm when in a locked position. In some embodiments, the method of controlling a rail gear assembly further includes moving the movable locking pin from the locked position to an unlocked position, where in the unlocked position the movable locking pin is removed from the locking pin receptacle. In some embodiments, the method of controlling a rail gear assembly further includes verifying that the locking pin is in the unlocked position. In some embodiments, a rail gauge member having a first end pivotally coupled to the first wheel arm and a second end pivotally coupled to the second wheel arm maintains a gauge between the first wheel and the second wheel.

BRIEF DESCRIPTION OF THE FIGURES

The accompanying drawings, which are incorporated herein and form part of the specification, illustrate embodiments and, together with the description, further serve to explain the principles of the embodiments and to enable a person skilled in the relevant art(s) to make and use the embodiments.

FIG. 14 is a block diagram of an example method for controlling a rail gear assembly according to various aspects of the invention.

FIG. 15 is a block diagram of an example method for controlling a rail gear assembly according to various aspects of the invention.

Figure 1:
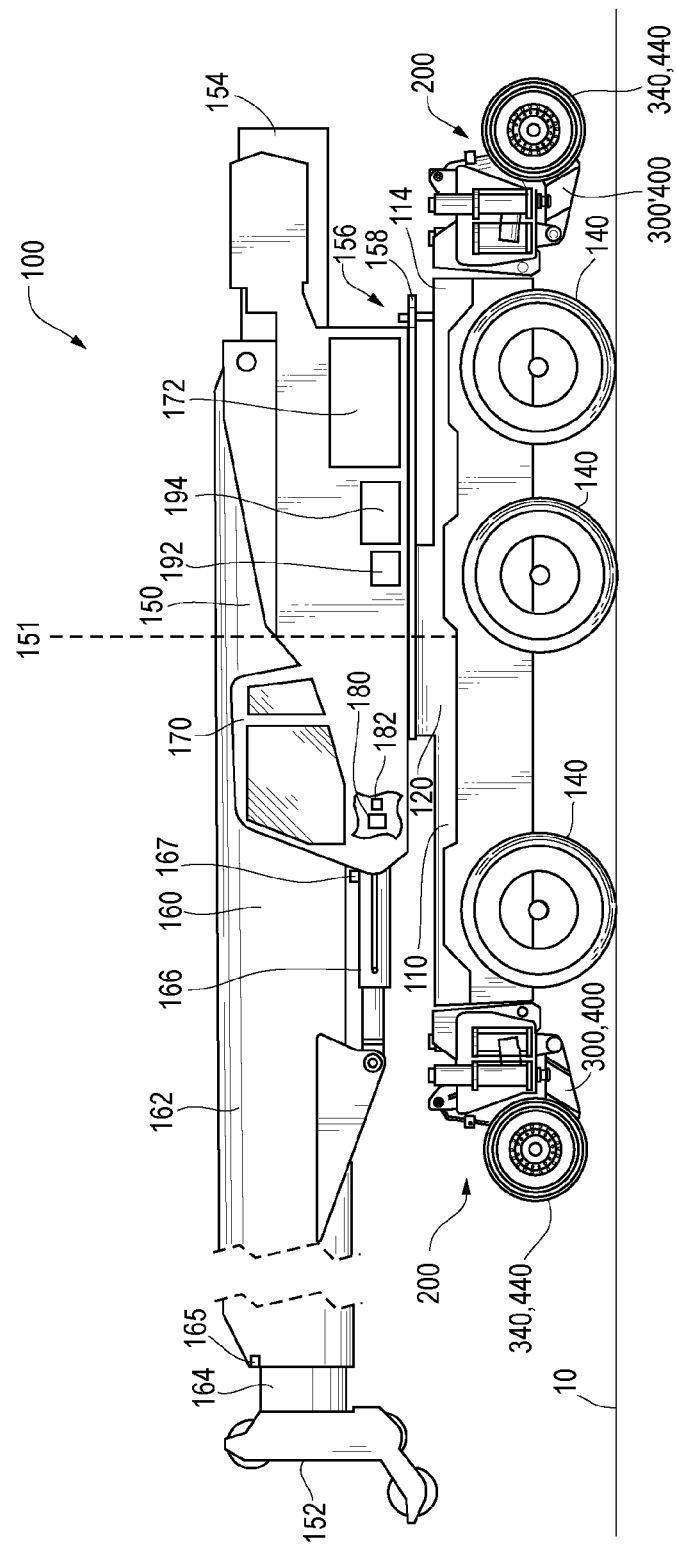
FIG. 1 is a side view of a vehicle with rail gear assemblies in a first state according to various aspects of the invention.

The features and advantages of the embodiments will become more apparent from the detail description set forth below when taken in conjunction with the drawings, in which like reference characters identify corresponding elements throughout. In the drawings like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Some road-rail vehicles may include drivetrain for traveling on both roads and on railways. For example, some road-rail vehicles may include conventional road wheels (e.g., rubber tires) for traveling on a road as well as rail gear—which may be raised and lowered—having rail wheels for traveling on the rails of a railway track. Some road-rail vehicles include a pair of rail wheels disposed on the front end of the vehicle and another pair of rail wheels disposed on the rear of the vehicle. Each pair of rail wheels may, for example, share an axle and may be linked together such that they are raised and lowered simultaneously.

Embodiments of the present disclosure provide a rail gear assembly for a vehicle that includes a pair of rail wheels, where the position of each rail wheel relative to the vehicle chassis is independently adjustable. Rail gear assemblies as described herein may include a pair of extendable and retractable wheel arms, each having a rail wheel rotatably coupled to a free end of the wheel arm. A first arm actuator may be configured to move the first arm from a retracted position to an extended position, and a second arm actuator may be configured to move the second arm from a retracted position to an extended position. The first and second arm actuators may also be configured to adjust the position of the pair of arms relative to the vehicle chassis and to one another during travel. As described in detail below, in certain configurations, independent adjustment of the wheel arms may allow the rail wheels to maintain better contact with the rails, thereby increasing the stability of the vehicle. In some embodiments, a road-rail vehicle may include two or more rail gear assemblies that may be, for example, mounted on the front end and rear end of the vehicle, respectively.

Figure 2:
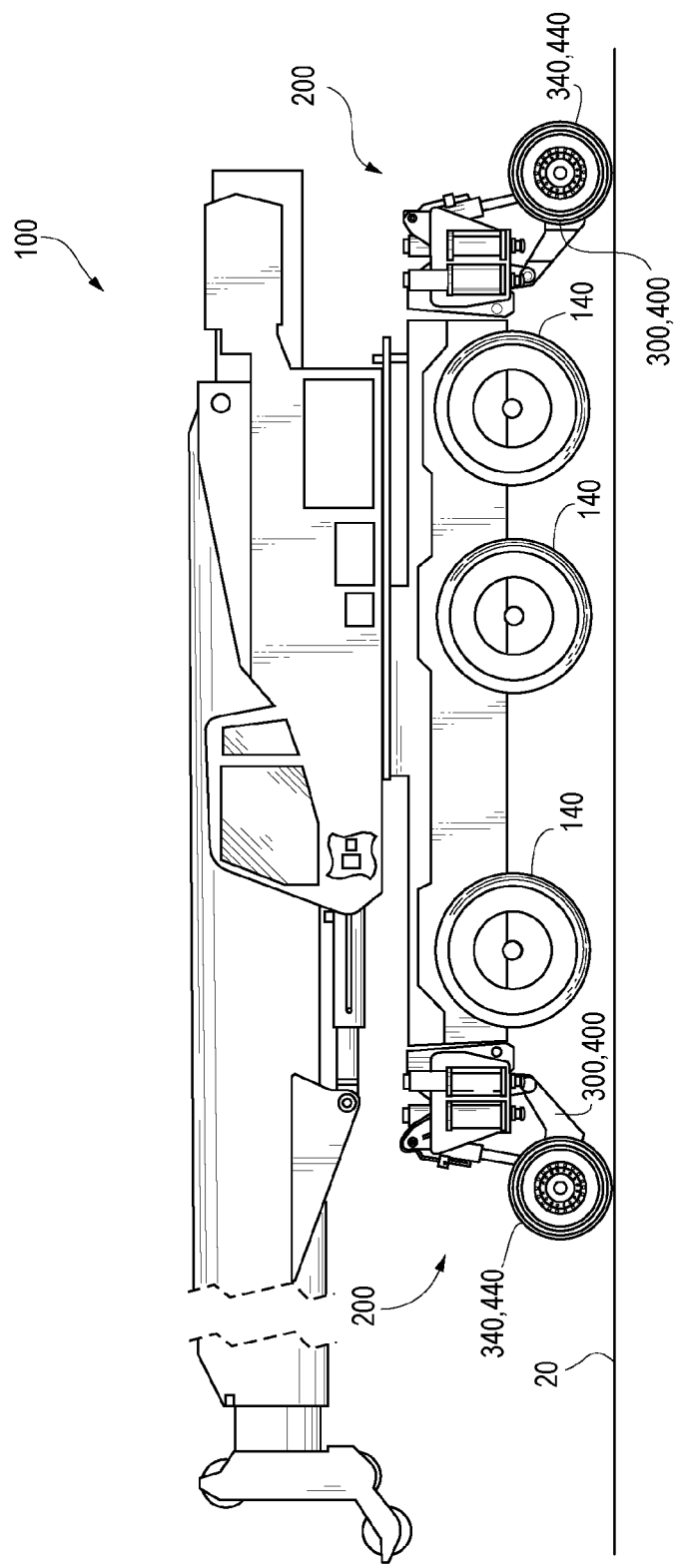
FIG. 2 is a side view of the vehicle with rail gear assemblies of FIG. 1 in a second state, according to various aspects of the invention.

Embodiments will now be described in more detail with reference to the figures. With reference to FIGS. 1 and 2, for example, in some embodiments, a vehicle 100 includes a first rail gear assembly 200 disposed on a first end 112 of a chassis 110 of vehicle 100. In some embodiments, vehicle 100 includes a second rail gear assembly 200 disposed on a second end 114 of vehicle chassis 110 that is opposite first end 112. In some embodiments, rail gear assemblies 200 are movable between a retracted position and an extended position. For example, FIG. 1 shows vehicle 100 with rail gear assemblies 200 in their retracted positions, and FIG. 2 shows vehicle 100 with rail gear assemblies 200 in their extended positions.

With rail gear assemblies 200 in their retracted positions, vehicle 100 may be supported by and may travel on non-rail wheels 140. In some embodiments, non-rail wheels 140 are, for example, rubber tires or the like that permit vehicle 100 to travel on a non-rail surface 10 (e.g., a road or the ground). In some embodiments, vehicle 100 may include other means for traveling on non-rail surface 10 such as, for example, continuous tracks, caterpillar tracks, rubber tracks, or the like. In another aspect, vehicle 100 can include a hull (not shown) for travel on a waterway.

With rail gear assemblies 200 in their extended position, vehicle 100 may be supported by rail wheels 340, 440. In some embodiments, rail wheels 340, 440 are, for example, flanged steel wheels or the like that permit vehicle 100 to travel on rails 20 (e.g. a railroad track, railway track, tram track, subway track, or the like).

Vehicle 100 may be, for example, a road-rail vehicle having drivetrain for travel on both non-rail surface 10 and rails 20. In some embodiments, vehicle 100 can be a purpose-built vehicle including drivetrain for both rail travel and non-rail travel. In some embodiments, vehicle 100 can be a conventional road vehicle that has been modified to include drivetrain for rail travel. In some embodiments, vehicle 100 can be a passenger vehicle such as a truck, pickup truck, utility truck, car, sport utility vehicle, or the like. In some embodiments, vehicle 100 can be a heavy-duty vehicle such as, for example, a construction vehicle. In some embodiments, vehicle 100 can be a mobile crane such as, for example, a truck-mounted crane, rough terrain crane, or crawler crane.

As mentioned above, vehicle 100 may include a vehicle chassis 110 having a first end 112 and a second end 114. In some embodiments, vehicle 100 may include a turret 150 that is disposed vertically above vehicle chassis 110, as shown in FIG. 1. In some embodiments, turret 150 can be rotatable relative to vehicle chassis 110 about a vertical axis 151. In some embodiments, a turntable, for example, can be disposed between vehicle chassis 110 and turret 150 and permit turret 150 to rotate relative to vehicle chassis 110. In some embodiments, turret 150 can include a first end 152 and a second end 154. As shown in FIG. 1, for example, first end 152 of turret 150 may be disposed adjacent to first end 112 of vehicle chassis 110 and second end 154 of turret 150 may be disposed adjacent to second end 114 of vehicle chassis 110. However, because turret 150 is rotatable relative to vehicle chassis 110, turret 150 may be rotated such that first end 152 of turret 150 is disposed adjacent to second end 114 of vehicle chassis 110 and second end 154 of turret 150 is disposed adjacent to first end 112 of vehicle chassis 110. In some embodiments, turret 150 may rotate approximately 180 degrees about vertical axis 151 relative to vehicle chassis 110. In some embodiments, turret 150 may rotate 360 degrees about vertical axis 151 relative to vehicle chassis 110.

As shown in FIG. 1, in some embodiments, vehicle 100 can include a control unit 180 that controls certain operations of the vehicle, as discussed in further detail below. Control unit 180 may receive input from various sensors of vehicle 100 in order to enable and/or disable functionality of rail gear assemblies 200. As described in further detail below, control unit 180 may, for example, receive outputted electronic data from various sensors of vehicle 100. Control unit 180 may then, for example, compare electronic data received from the sensors to predetermined electronic data stored in the memory of control unit 180 in order to determine the state and/or position of certain vehicle 100 and/or rail gear assembly 200 components. Control unit 180 may also include, for example, visual displays, alarms, buttons, touch screens, or the like that provide information to the operator or receive input from the operator.

In some embodiments, turret 150 may include a swing lock mechanism 156 that when engaged prevents turret 150 from rotating relative to vehicle chassis 110. In some embodiments, swing lock mechanism 156 may include a swing lock sensor 158 that senses whether swing lock mechanism 156 is engaged. As described in further detail below, swing lock sensor 158 may, for example, indicate to an operator and/or control unit 180 whether swing lock mechanism 156 is engaged. In some embodiments, swing lock sensor 158 may output electronic data that is received by control unit 180. Control unit 180 may, for example, use the electronic data received from swing lock sensor 158 in order to determine whether swing lock mechanism 156 is engaged. In some embodiments, when swing lock mechanism 156 is engaged, swing lock sensor 158 may output electronic data that is different than when swing lock mechanism 156 is not engaged. Control unit 180 may store in its memory, for example, predetermined electronic data that corresponds to the electronic data that will be output by swing lock sensor 158 when swing lock mechanism 156 in an engaged and/or disengaged position. In order to determine if swing lock mechanism 156 is engaged or disengaged, control unit 180 may, for example, compare the electronic data received from swing lock sensor 158 to the predetermined electronic data stored in the memory of control unit 180.

In some embodiments, swing lock mechanism 156 is engaged and disengaged, for example, by inserting or removing a locking pin that mechanically links turret 150 to vehicle chassis 110. In some embodiments, the locking pin may extend through a hole on turret 150 and into a hole on vehicle chassis 110. In some embodiments, the locking pin may extend from a portion of turret 150 and into a hole on vehicle chassis 110. In some embodiments, swing lock mechanism 156 may only be engaged when turret 150 is in a certain position relative to vehicle chassis 110 (e.g., when the locking pin is aligned with the receiving hole). In some embodiments, swing lock mechanism 156 may only be engaged when first end 152 of turret 150 is disposed adjacent to first end 112 of vehicle chassis 110 (see, e.g., FIG. 1). In some embodiments, swing lock mechanism 156 may be engaged when turret 150 is in two or more positions relative to vehicle chassis 110 (e.g., when the locking pin is aligned with one of several receiving holes on vehicle chassis 110). In some embodiments, swing lock mechanism 156 may only be engaged when turret 150 is in two positions relative to vehicle chassis 110. The first position in which swing lock mechanism 156 may be engaged may be, for example, when first end 152 of turret 150 is disposed adjacent to first end 112 of vehicle chassis 110. The second position in which swing lock mechanism 156 may be engaged may be, for example, when turret 150 is rotated approximately 180 degrees relative to the first position such that first end 152 of turret 150 is disposed adjacent to second end 114 of vehicle chassis 110.

In some embodiments, swing lock mechanism 156 is manually controlled by an operator (e.g., by manually inserting or removing the locking pin or by moving a lever that is configured to insert or remove the locking pin). In some embodiments, swing lock mechanism 156 is remotely controlled (e.g., using control unit 180).

In some embodiments, swing lock mechanism 156 may include several locking pins that may be engaged independently, for example, depending on the position of turret 150 relative to vehicle chassis 110. In some embodiments, vehicle 100 may include two or more swing lock sensors 158. For example, vehicle 100 may include a swing lock sensor 158 corresponding to and disposed at each of the positions in which swing lock mechanism 156 may be engaged. In some embodiments, control unit 180 may use electronic data received from the two or more swing lock sensors 158 in order to determine the position of turret 150 relative to vehicle chassis 110.

In some embodiments, turret 150 includes a cab 170 where a vehicle operator and/or vehicle passengers may reside during operation of vehicle 100. In some embodiments, vehicle 100 may be capable of bidirectional travel, which is to say that either of first end 112 of vehicle chassis 110 or second end 114 of vehicle chassis 110 may be the leading end relative to the direction of travel. Because turret 150 is rotatable relative to vehicle chassis 110, turret 150 may be rotated such that cab 170 faces either of first end 112 of vehicle chassis 110 or second end 114 of vehicle chassis 110. Thus, cab 170 may face the direction of travel of vehicle 100 whether first end 112 of vehicle chassis 110 or second end 114 of vehicle chassis 110 is the leading end relative to the direction of travel.

The reversibility of cab 170 may simplify operation of vehicle 100, and may increase the safety and/or efficiency of vehicle 100. For example, vehicle 100 may travel along rails 20 to a desired location with cab 170 facing in the direction of travel. Then, if vehicle 100 needs to travel along rails 20 in the opposite direction, for example, turret 150 may be rotated such that cab 170 faces the opposite direction, thereby allowing cab 170 to again face the direction of travel. In this manner, an operator may not need to drive vehicle 100 while facing the direction opposite of travel (i.e. driving in reverse), which may make vehicle 100 easier and/or safer to operate. Further, in order for cab 170 to face the direction of travel, an operator may not need not to disengage vehicle 100 from rails 20, turn vehicle 100 around using, for example, non-rail wheels 140, and then remount vehicle 100 on rails 20, which may increase the efficiency of vehicle 100.

In some embodiments, vehicle 100 includes a boom 160 that is, for example, used to lift and move objects. In some embodiments, boom 160 may be movable between a lowered position (e.g., where boom 160 is positioned substantially parallel to vehicle chassis 110) and a raised position (e.g., where boom 160 is positioned at an angle relative to vehicle chassis 110). Boom 160 may be moved from a lowered position to a raised position using, for example, a boom actuator 166. In some embodiments, boom 160 can include a boom position sensor 167 that senses the position of boom 160. Boom position sensor 167 may, for example, indicate to an operator and/or control unit 180 whether boom 160 is in a raised position or a lowered position. In some embodiments, boom position sensor 167 may output electronic data that is received by control unit 180. Control unit 180 may, for example, use the electronic data received from boom position sensor 167 to determine whether boom 160 is in a raised position or a lowered position. In some embodiments, when boom 160 is in a raised position, boom position sensor 167 may output electronic data that is different than when boom 160 is in a lowered position. Control unit 180 may store in its memory, for example, predetermined electronic data that corresponds to the electronic data that will be output by boom position sensor 167 when boom 160 is in a raised position and/or a lowered position. In order to determine if boom 160 is in a raised position or a lowered position, control unit 180 may, for example, compare the electronic data received from boom position sensor 167 to the predetermined electronic data stored in the memory of control unit 180.

In some embodiments, boom 160 is extendable (e.g., telescopically). In some embodiments, boom 160 includes a base section 162 and a telescopic section 164, where telescopic section 164 is moveable between an extended position and a retracted position relative to base section 162. In some embodiments, boom 160 includes a telescopic extension sensor 165 that senses the position of telescopic section 164 relative to base section 162. Telescopic extension sensor 165 may, for example, indicate to an operator and/or control unit 180 whether boom 160 is in an extended position or a retracted position. In some embodiments, telescopic extension sensor 165 may output electronic data that is received by control unit 180. Control unit 180 may, for example, use the electronic data received from telescopic extension sensor 165 to determine whether boom 160 is in an extended position or a retracted position. In some embodiments, when boom 160 is in an extended position, telescopic extension sensor 165 may output electronic data that is different than when boom 160 is in a retracted position. Control unit 180 may store in its memory, for example, predetermined electronic data that corresponds to the electronic data that will be output by telescopic extension sensor 165 when boom 160 is in an extended position and/or a retracted position. In order to determine if boom 160 is in an extended position or a retracted position, control unit 180 may, for example, compare the electronic data received from telescopic extension sensor 165 to the predetermined electronic data stored in the memory of control unit 180.

In some embodiments, vehicle 100 can include a motor 172. In some embodiments, motor 172 can transmit power to non-rail wheels 140 through mechanical means (e.g., through a gearbox, driveshaft, drive axle, etc.). As discussed in further detail below, in some embodiments, vehicle 100 includes a hydraulic reservoir 192 and a hydraulic pump 194. In some embodiments, motor 172 can provide power to hydraulic pump 194. In some embodiment, non-rail wheels 140 are driven by one or more hydraulic motors that receive hydraulic fluid from hydraulic pump 194.

In some embodiments, vehicle 100 can include a vehicle speed sensor 182. Vehicle speed sensor 182 may determine the velocity of vehicle 100 during rail and/or non-rail travel. Speed sensor 182 may, for example, indicate to an operator and/or control unit 180 the velocity of vehicle 100 and/or whether or not vehicle 100 is stopped. In some embodiments, vehicle speed sensor 182 may output electronic data that is received by control unit 180. Control unit 180 may, for example, use the electronic data received from vehicle speed sensor 182 to determine whether or not vehicle 100 is stopped. In some embodiments, when vehicle 100 is stopped, vehicle speed sensor 182 may output electronic data that is different than when vehicle 100 is not stopped. Control unit 180 may store in its memory, for example, predetermined electronic data that corresponds to the electronic data that will be output by vehicle speed sensor 182 when vehicle 100 is stopped and/or not stopped. In order to determine if vehicle 100 is stopped or not stopped, control unit 180 may, for example, compare the electronic data received from vehicle speed sensor 182 to the predetermined electronic data stored in the memory of control unit 180.

With reference to FIGS. 3-8, for example, a rail gear assembly 200 may include a base 210, a first wheel arm 300, and a second wheel arm 400. Base 210 may be disposed on, coupled to, or integrally formed with vehicle 100. In some embodiments, base 210 is a portion of vehicle 100 such as, for example, a frame 120 of vehicle 100 (see FIG. 1). In some embodiments, base 210 is an outrigger box of vehicle 100.

In some embodiments, first wheel arm 300 may extend from a first end 310 to a second end 320. In some embodiments, first end 310 of first wheel arm 300 may be coupled to base 210 at a first arm connection 230. First arm connection 230 may be, for example, a hinge, pivot, or the like such that first wheel arm 300 may rotate relative to base 210. In some embodiments, a rail wheel 340 may be rotatably coupled to second end 320 of first wheel arm 300 by a first rail axle 330. In this manner, the position of rail wheel 340 relative to base 210 may be changed by rotating first wheel arm 300 about first arm connection 230.

In some embodiments, rail gear assembly 200 can include a first wheel arm actuator 370 having a first end 372 and a second end 374. In some embodiments, first wheel arm actuator 370 may be movable between a retracted position and an extended position, where the distance between first and second ends 372, 374 in the retracted position is less than the distance between first and second ends 372, 374 in the extended position. In some embodiments, first end 372 of first wheel arm actuator 370 may be coupled to base 210 at a first actuator base connection 237 and second end 374 of first wheel arm actuator 370 may be coupled to first wheel arm 300 at a first actuator arm connection 352. Thus, by extending or retracting first wheel arm actuator 370, first wheel arm 300 may be rotated about first arm connection 230 from a retracted position (see, e.g., FIG. 1) to an extended position (see, e.g., FIG. 2). In some embodiments, first wheel arm actuator 370 may be a hydraulic actuator. In some embodiments, first wheel arm actuator 370 may be an electric actuator, mechanical actuator, pneumatic actuator, or other mechanism capable of adjusting the position of first wheel arm 300 relative to base 210. In some embodiments, first wheel arm actuator 370 may be a linear actuator that produces linear motion. In some embodiments, first wheel arm actuator 370 may be a rotary actuator that produces rotary motion or torque.

In some embodiments, second wheel arm 400 may extend from a first end 410 to a second end 420. In some embodiments, first end 410 of second wheel arm 400 may be coupled to base 210 at a second arm connection 240. Second arm connection 240 may be, for example, a hinge, pivot, or the like such that second wheel arm 400 may rotate relative to base 210. In some embodiments, a rail wheel 440 may be rotatably coupled to second end 420 of second wheel arm 400 by a second rail axle 430. In this manner, the position of rail wheel 440 relative to base 210 may be changed by rotating second wheel arm 400 about second arm connection 240.

In some embodiments, first wheel arm 300 and second wheel arm 400 can be independently rotatable relative to base 210 about first arm connection 230 and second arm connection 240, respectively. In some embodiments, an axis of rotation 232 of first wheel arm 300 and an axis of rotation 242 of second wheel arm 400 are collinear. While first wheel arm 300 and second wheel arm 400 can be independently rotatable about their respective axes of rotation 232, 242, the rotation of first and second wheel arms 300, 400 may be constrained in certain directions. For example, first and second wheel arms 300, 400 may move in a substantially vertical direction by rotating about their respective axes of rotation 232, 242. However, a rail gauge member 600 may constrain movement of first and second wheel arms 300, 400 in a substantially horizontal direction, for example, by preventing or reducing horizontal rotation of first and second wheel arms 300, 400. Rail gauge member 600 is discussed in further detail below.

In some embodiments, rail gear assembly 200 includes a second wheel arm actuator 470 having a first end 472 and a second end 474. In some embodiments, second wheel arm actuator 470 may be movable between a retracted position and an extended position, where the distance between first and second ends 472, 474 in the retracted position is less than the distance between first and second ends 472, 474 in the extended position. In some embodiments, first end 472 of second wheel arm actuator 470 may be coupled to base 210 at a second actuator base connection 247 and second end 474 of second wheel arm actuator 470 may be coupled to second wheel arm 400 at a second actuator arm connection 452. Thus, by extending or retracting second wheel arm actuator 470, second wheel arm 400 may be rotated about second arm connection 240 from a retracted position (see, e.g., FIG. 1) to an extended position (see, e.g., FIG. 2). In some embodiments, second wheel arm actuator 470 may be a hydraulic actuator. In some embodiments, second wheel arm actuator 470 may be an electric actuator, mechanical actuator, pneumatic actuator, or other mechanism capable of adjusting the position of second wheel arm 400 relative to base 210. In some embodiments, second wheel arm actuator 470 may be a linear actuator that produces linear motion. In some embodiments, second wheel arm actuator 470 may be a rotary actuator that produces rotary motion or torque.

In some embodiments, rail gear assembly 200 can include one or more wheel arm extension sensors 280 that sense the position of first and/or second wheel arms 300, 400. Wheel arm extension sensors 280 may, for example, indicate to an operator and/or control unit 180 whether first and second wheel arms 300, 400 are in their extended positions or retracted positions. In some embodiments, wheel arm extension sensors 280 may output electronic data that is received by control unit 180. Control unit 180 may, for example, use the electronic data received from wheel arm extension sensors 280 to determine whether first and second wheel arms 300, 400 are in their extended positions or retracted positions. In some embodiments, when first and second wheel arms 300, 400 are in their extended positions, wheel arm extension sensors 280 may output electronic data that is different than when first and second wheel arms 300, 400 are in their retracted positions. Control unit 180 may store in its memory, for example, predetermined electronic data that corresponds to the electronic data that will be output by wheel arm extension sensors 280 when first and second wheel arms 300, 400 are in their extended positions and/or their retracted positions. In order to determine if first and second wheel arms 300, 400 are in their extended positions or their retracted positions, control unit 180 may, for example, compare the electronic data received from wheel arm extension sensors 280 to the predetermined electronic data stored in the memory of control unit 180. In some embodiments, rail gear assembly 200 may include two wheel arm extension sensors 280, for example, where the first wheel arm sensor 280 may be used to determine if first and second wheel arms 300, 400 are in their extended positions and the second wheel arm sensor 280 may be used to determine if first and second wheel arms 300, 400 are in their retracted positions.

With reference to FIGS. 5-8, for example, in some embodiments, rail gear assembly includes a wheel arm locking system 500. In some embodiments, wheel arm locking system 500 may include a movable locking pin 510 and a locking pin receptacle 520 that is configured to receive locking pin 510. Movable locking pin 510 may be, for example, disposed in or on first wheel arm 300 and may extend in a direction that is substantially perpendicular to an inner surface 354 of first wheel arm 300. Locking pin receptacle 520 may be, for example, disposed on second wheel arm 400 and may be disposed on an inner surface 454 of second wheel arm 400. Inner surface 354 may be disposed adjacent to and substantially parallel to inner surface 454. In some embodiments, in a locked position, movable locking pin 510 may extend from first arm 300 and into locking pin receptacle 520. In this manner, in the locked position, first and second wheel arms 300, 400 are linked together and rotate simultaneously about their respective axes of rotation 232, 242. In some embodiments, in an unlocked position, movable locking pin 510 may be removed from locking pin receptacle 520 and, thus, first and second wheel arms 300, 400 may rotate independently about their respective axes of rotation 232, 242.

In some embodiments, movable locking pin 510 may be automatically actuated using, for example, a hydraulic actuator, electric actuator, or the like. In some embodiments, movable locking pin 510 may be manually moved from a locked position to an unlocked position by an operator. In some embodiments, locking pin receptacle may include a locking pin sensor 530 that senses the position of movable locking pin 510. Locking pin sensor 530 may, for example, indicate to an operator and/or control unit 180 whether movable locking pin 510 is in a locked position or an unlocked position. In some embodiments, locking pin sensor 530 may output electronic data that is received by control unit 180. Control unit 180 may, for example, use the electronic data received from locking pin sensor 530 to determine whether movable locking pin 510 is in a locked position or an unlocked position. In some embodiments, when movable locking pin 510 is in a locked position, locking pin sensor 530 may output electronic data that is different than when movable locking pin 510 is in an unlocked position. Control unit 180 may store in its memory, for example, predetermined electronic data that corresponds to the electronic data that will be output by locking pin sensor 530 when movable locking pin 510 is in a locked position and/or an unlocked position. In order to determine if movable locking pin 510 is in a locked position or an unlocked position, control unit 180 may, for example, compare the electronic data received from locking pin sensor 530 to the predetermined electronic data stored in the memory of control unit 180. In some embodiments, locking system 500 may include two locking pin sensors 530, for example, where the first locking pin sensor 530 may be used to determine if locking pin 510 is in its locked position and the second locking pin sensor 530 may be used to determine if locking pin 510 is in its unlocked position.

In some embodiments, first wheel arm 300 may include rotation stops 540 disposed on, coupled to, or integrally formed with inner surface 354. Likewise, in some embodiments, second wheel arm 400 may include rotation stops 540 disposed on, coupled to, or integrally formed with inner surface 454. Rotation stops 540 may, for example, limit the amount of independent rotation of the first and second wheel arms 300, 400 relative to one another. For example, if first wheel arm 300 rotates about its axis 232 in an upward direction, and second wheel arm 400 rotates about its axis 242 in a downward direction, rotation stops 540 may mechanically interfere with one another, thus limiting the amount of independent rotation of first wheel arm 300 relative to second wheel arm 400. In some embodiments, rotation stops 540 may permit a maximum of approximately 3 to 10 degrees of independent rotation of first wheel arm 300 relative to second wheel arm 400. In some embodiments, rotation stops 540 may permit a maximum of approximately 6 degrees of independent rotation of first wheel arm 300 relative to second wheel arm 400. In some embodiments, at the maximum independent rotation of first wheel arm 300 relative to second wheel arm 400, the bottom of rail wheel 340 may be vertically displaced approximately 3 to 10 inches relative to the bottom of rail wheel 440. In some embodiments, at the maximum independent rotation of first wheel arm 300 relative to second wheel arm 400, the bottom of rail wheel 340 may be vertically displaced approximately 6 inches relative to the bottom of rail wheel 440.

Figure 8:
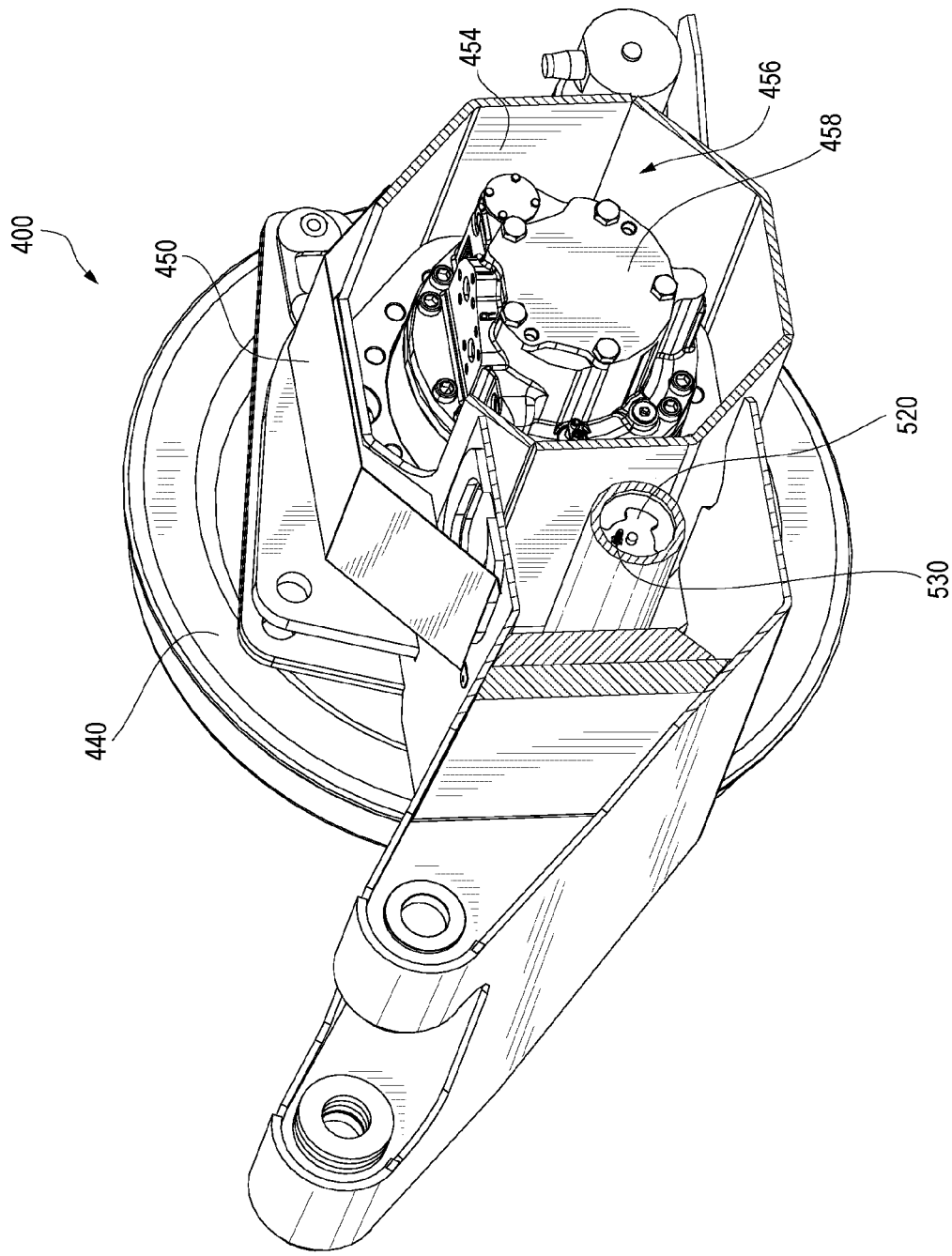
FIG. 8 is a cross-sectional view of the portion of a rail gear assembly of FIG. 7.

In some embodiments, first and/or second wheel arms 300, 400 may include a motor that drives rail wheels 340, 440. As shown in FIG. 8, for example, second wheel arm 400 may include an axle tube 350 having an inner surface 454 defining an interior space 456. In some embodiments, a rail wheel motor 458 may be disposed in interior space 456 and coupled and configured to drive rail wheel 440. Likewise, first wheel arm 300 may also include a rail wheel motor disposed in an interior space of axle tube 350 that may be coupled to and configured to drive rail wheel 340. In some embodiments, rail wheel motor 458 may be a hydraulic motor. As mentioned above, in some embodiments, non-rail wheels 140 may be driven by one or more non-rail wheel hydraulic motors. In some embodiments, in order to switch from driving non-rail wheels 140 to driving rail wheels 340, 440, fluid may be diverted from non-rail wheel hydraulic motors to the rail wheel hydraulic motors.

Figure 3:
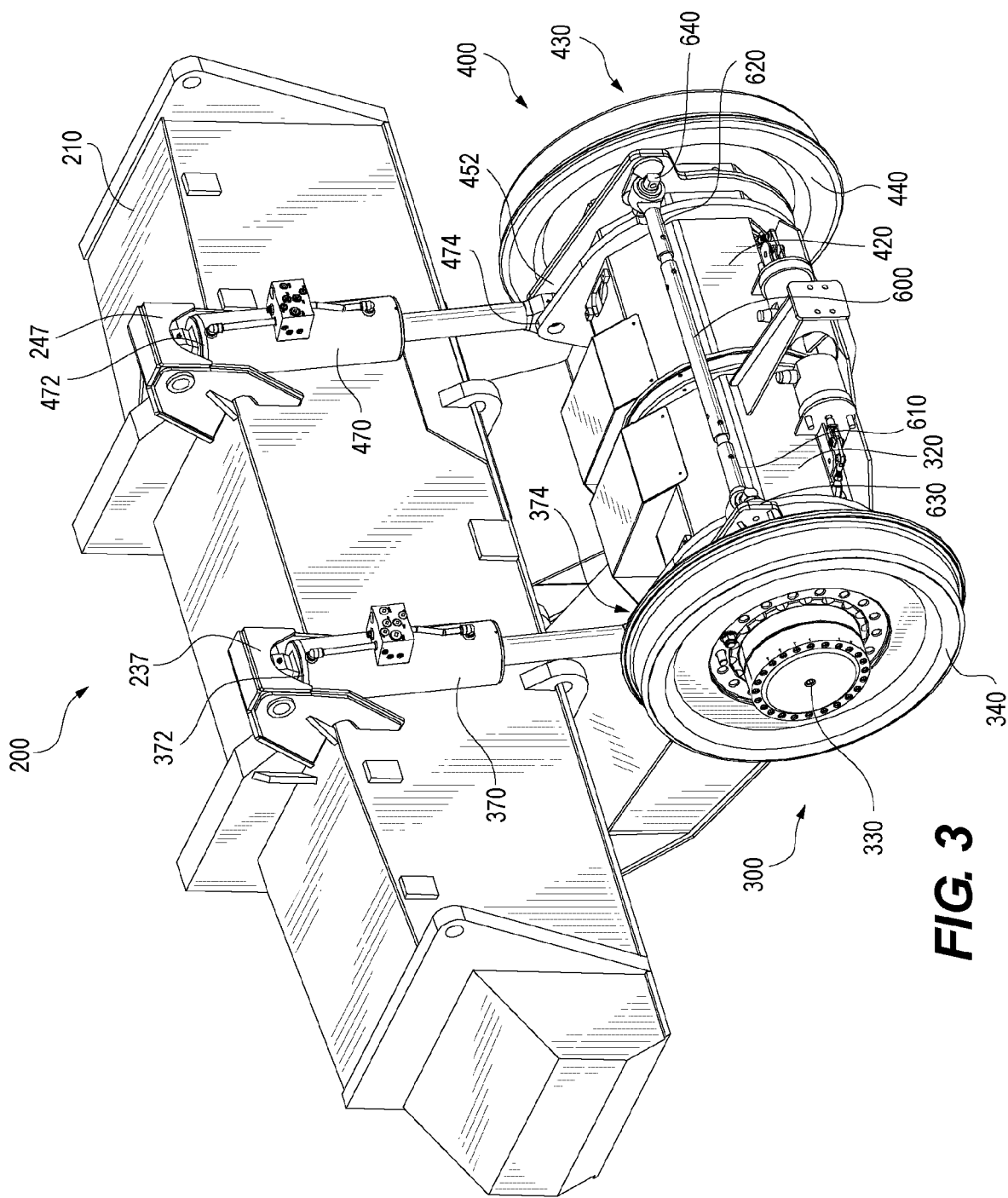
FIG. 3 is a front perspective view of a rail gear assembly according to various aspects of the invention.
Figure 4:
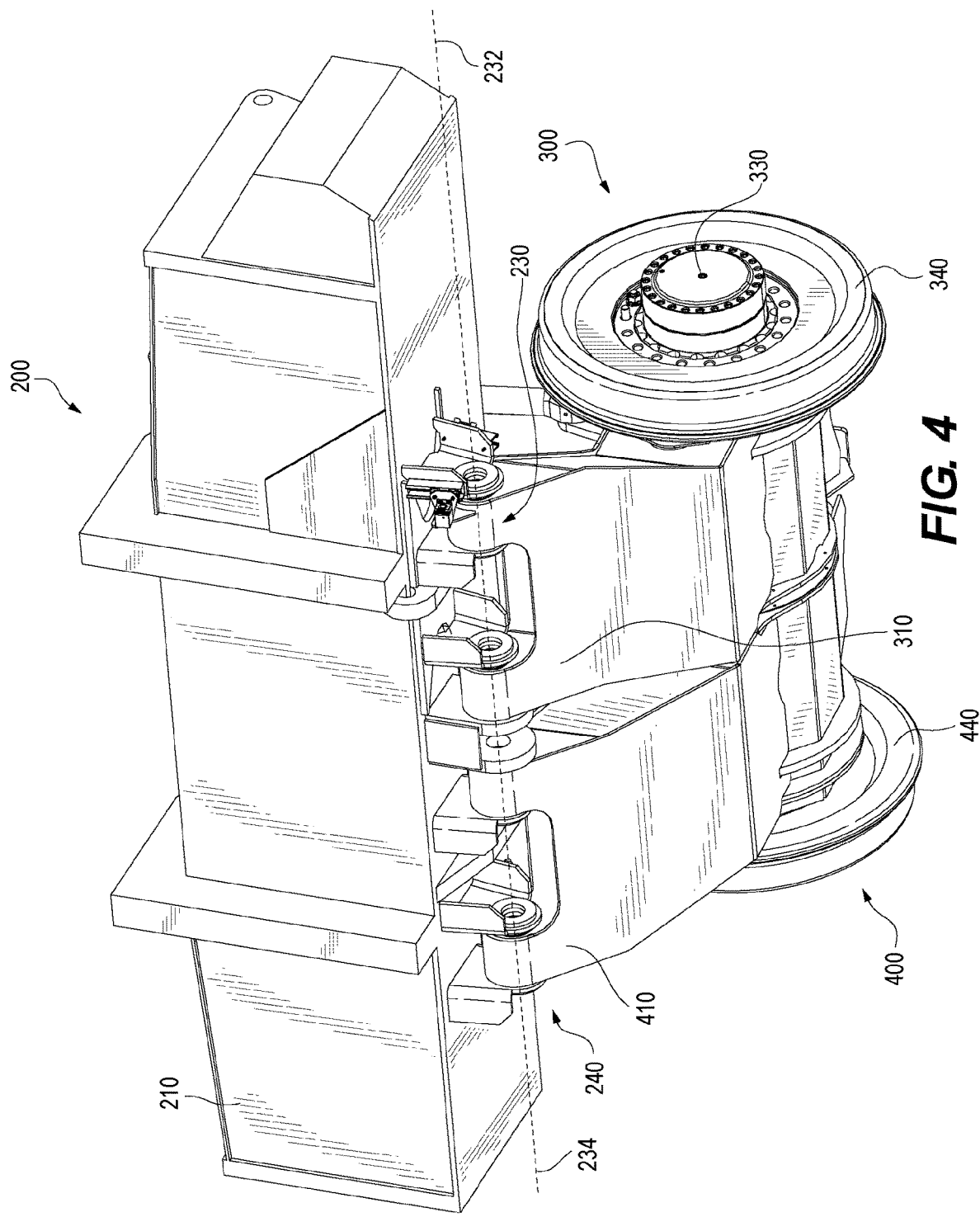
FIG. 4 is a rear perspective view of the rail gear assembly of FIG. 3.
Figure 5:
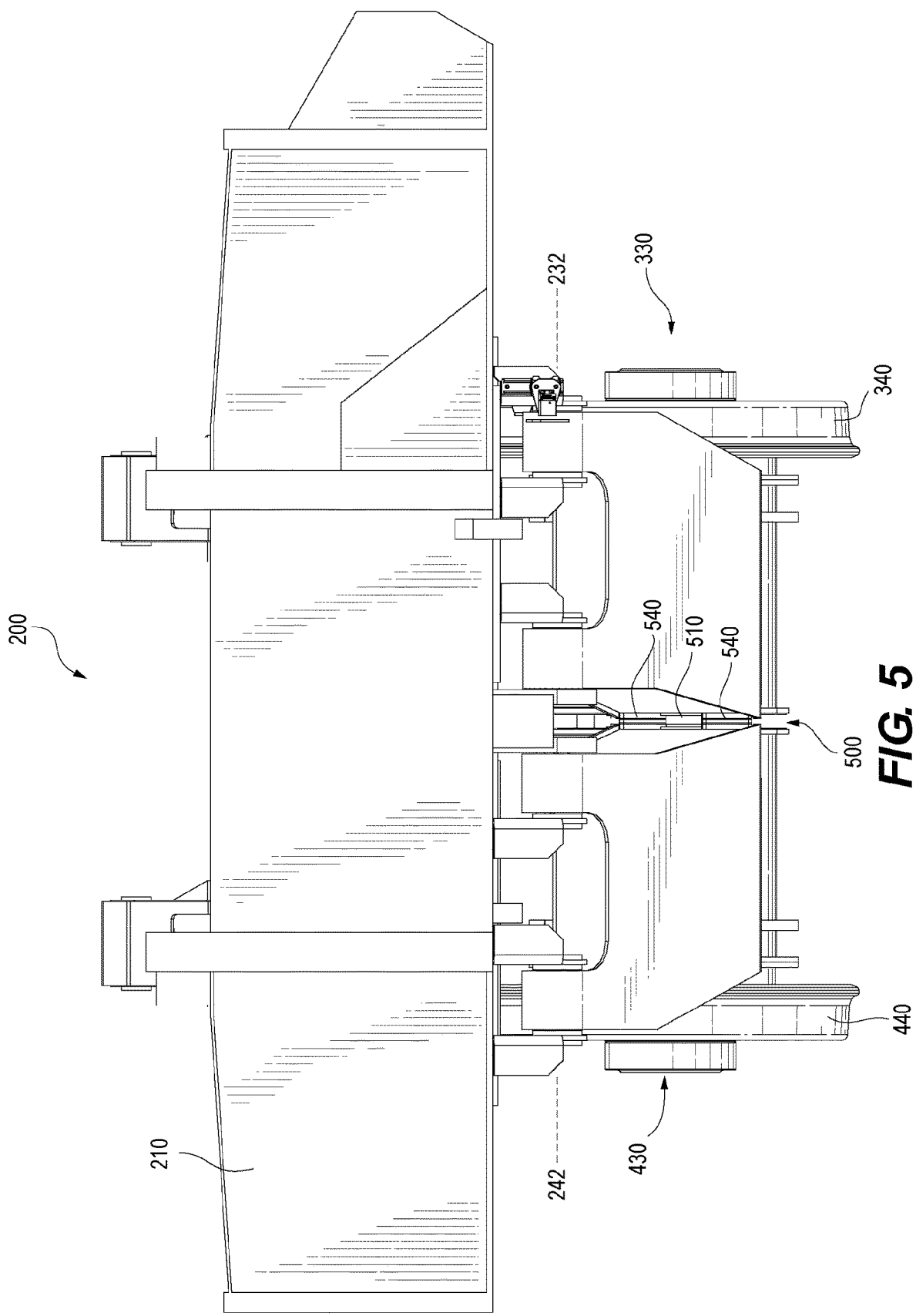
FIG. 5 is a rear view of the rail gear assembly of FIG. 3.
Figure 6:
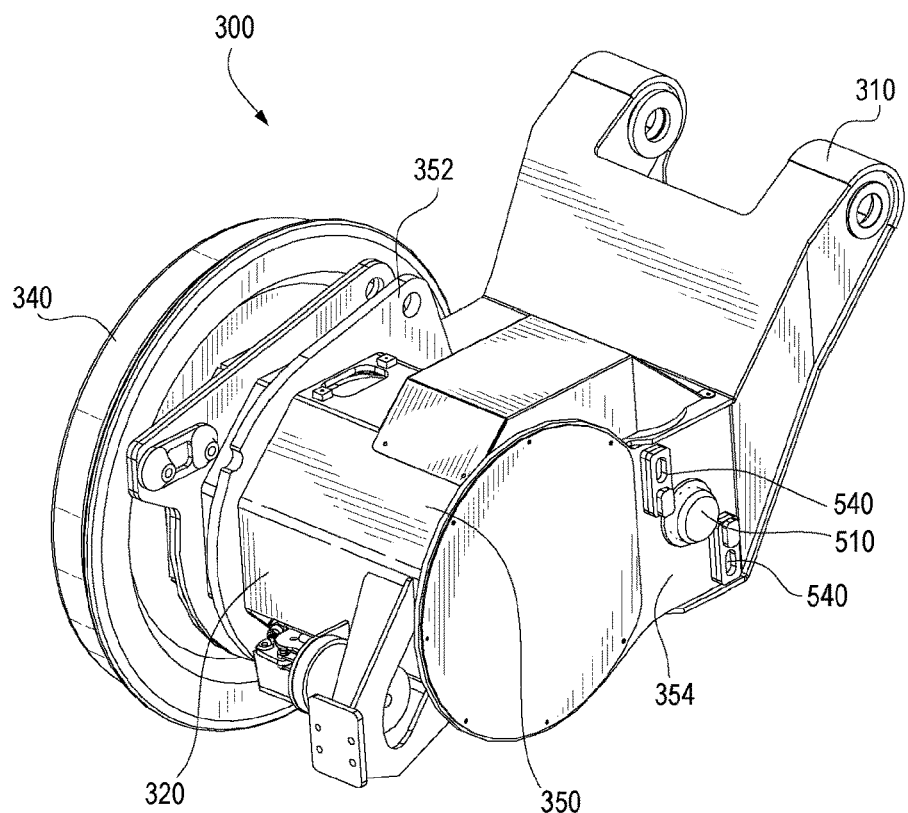
FIG. 6 is a front perspective view of a portion of a rail gear assembly according to various aspects of the invention.
Figure 7:
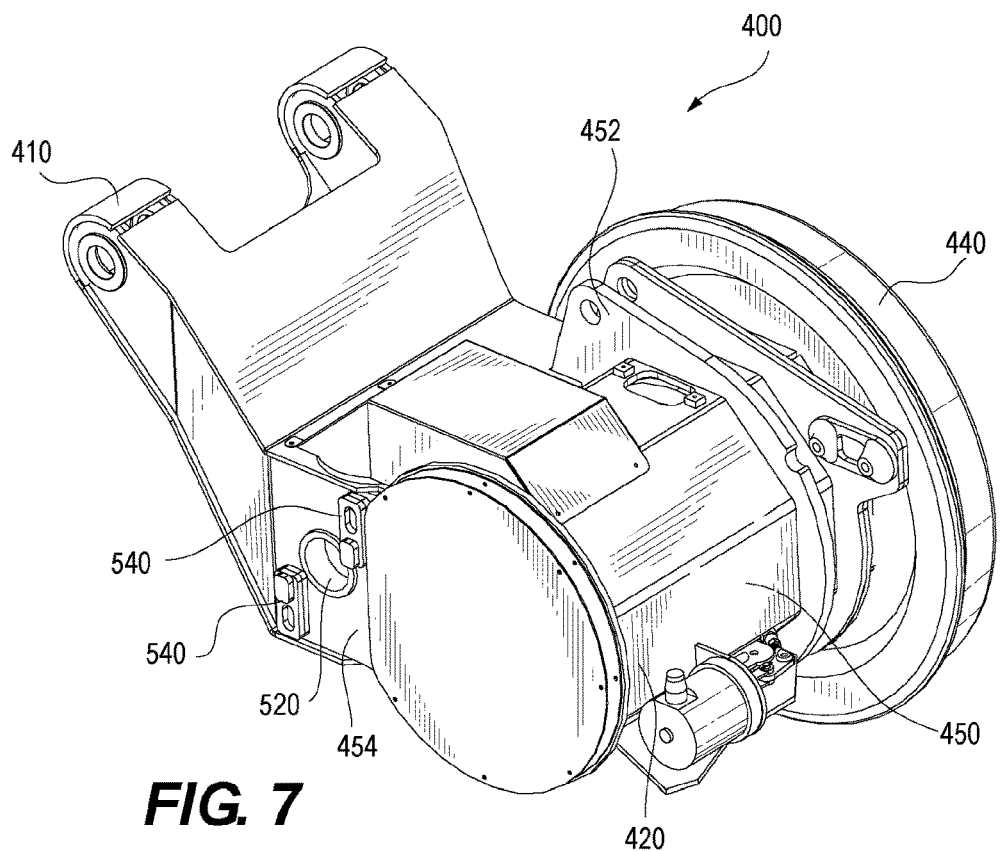
FIG. 7 is a front perspective view of a portion of a rail gear assembly according to various aspects of the invention.
Figure 9:
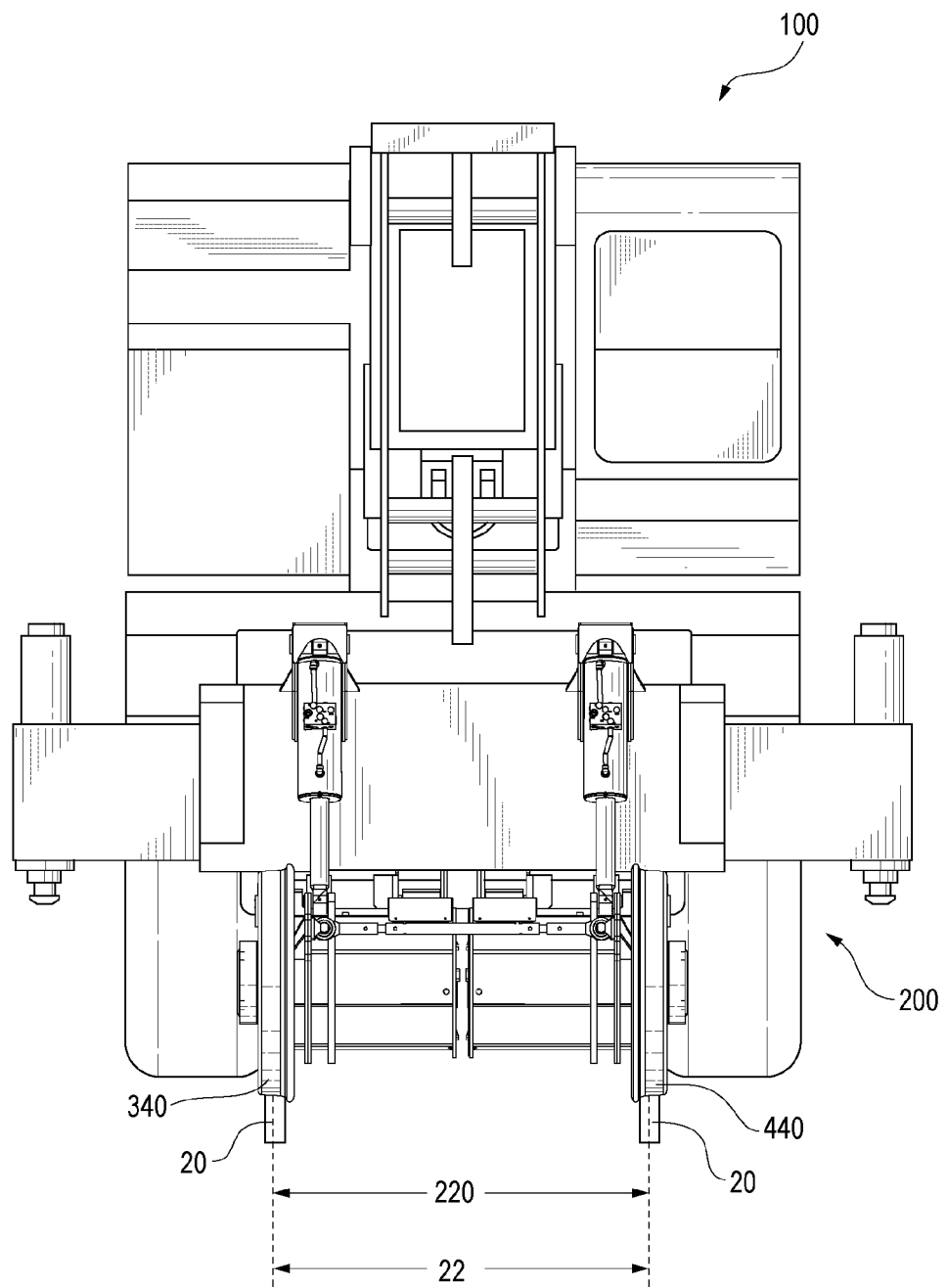
FIG. 9 is a front view of a vehicle with rail gear assembly according to various aspects of the invention.

With reference to FIGS. 3 and 9, for example, in some embodiments, rail gear assembly 200 may include a rail gauge member 600. In some embodiments, rail gauge member 600 can extend from a first end 610 to a second end 620. In some embodiments, first end 610 can be pivotally coupled to first wheel arm 300 at a first pivot 630 and second end 620 can be pivotally coupled to second wheel arm 400 at a second pivot 640. As shown in FIG. 9, for example, the distance between rails 20 may define a rail gauge 22. Rail gauge member 600 may be configured, for example, to maintain a wheel gauge 220 between rail wheels 340, 440 that may be approximately the same as rail gauge 22. For example, rail gauge member 600 may prevent rail wheels 340, 440 from moving close enough to one another such that wheels 340, 440 may fall between rails 20. In some embodiments, rail gauge member 600 may be extendable and retractable (e.g., telescopically) and may include mechanical stops that limit the amount that rail gauge member 600 may retract, thus providing a minimum gauge between rail wheels 340, 440. In some embodiments, rail gauge member 600 may be modular and/or replaceable such that rail gauge member 600 may be reconfigured to accommodate different rail gauges on different railways or at different locations along a railway.

As mentioned above, in some embodiments, first wheel arm actuator 370 and second wheel arm actuator 470 can be hydraulic actuators. FIGS. 10-13, for example, show an exemplary hydraulic system according to some embodiments. In some embodiments, first wheel arm actuator 370 may include a first fluid chamber 376, a second fluid chamber 378, and a piston 380, where a difference in pressure between the first fluid chamber 376 and the second fluid chamber 378, for example, causes piston 380 to move from a retracted position to an extended position, or vice versa. Likewise, in some embodiments, second wheel arm actuator 470 may include a first fluid chamber 476, a second fluid chamber 478, and a piston 480, where a difference in pressure between first fluid chamber 476 and second fluid chamber 478, for example, causes piston 480 to move from a retracted position to an extended position, or vice versa.

In some embodiments, first and second wheel arm actuators 370, 470 may be hydraulically connected to hydraulic pump 194 and hydraulic reservoir 192 via fluid lines 190. In some embodiments, hydraulic pump 194, for example, may produce sufficient fluid flow to generate pressurized hydraulic fluid at its outlet. In some embodiments, a control valve 198 may be hydraulically disposed between first and second wheel arm actuators 370, 470, pump 194, and reservoir 192. Control valve 198 may, for example, control the flow of fluid from pump 194 to first and second wheel arm actuators 370, 470 and the flow of fluid from first and second wheel arm actuators 370, 470 to reservoir 192.

Figure 10:
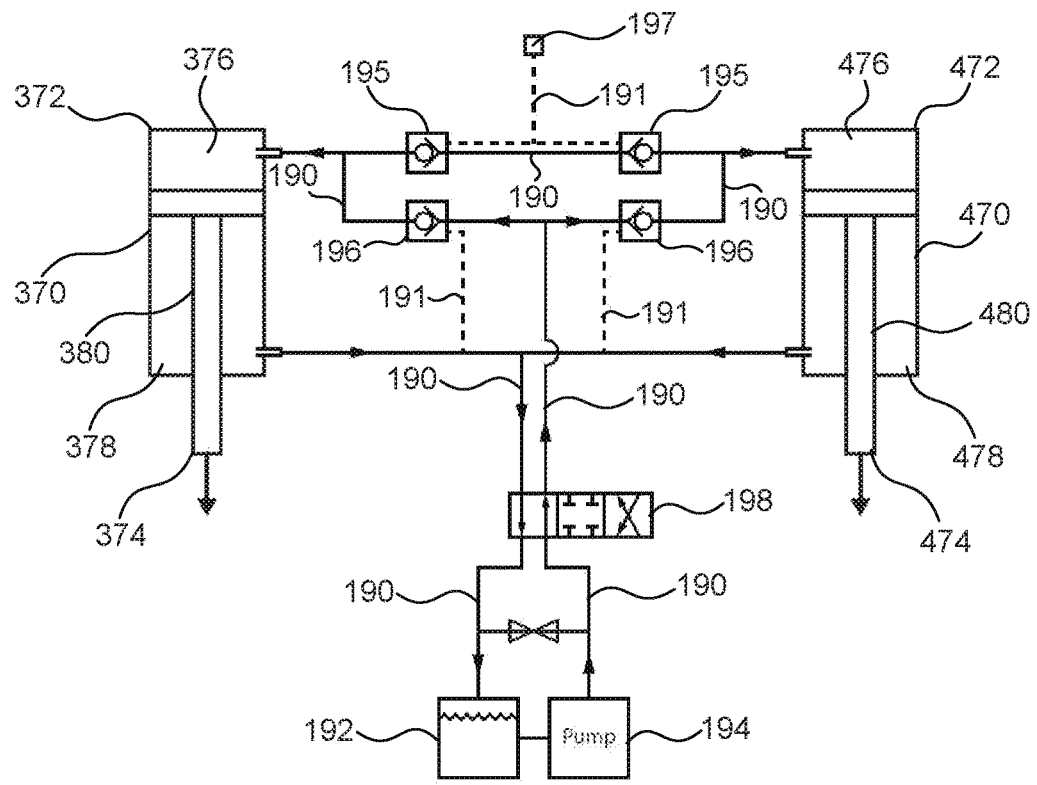
FIG. 10 is a block diagram of an example hydraulic system in a first state according to various aspects of the invention.

As shown in FIG. 10, for example, in some embodiments, a check valve 196 may be hydraulically disposed between control valve 198 and each of first fluid chambers 376, 476. In some embodiments, check valves 196 may be, for example, pilot operated check valves that allow singledirectional fluid flow at all times and allow bidirectional flow when, for example, a pilot pressure is supplied to the check valve 196. In some embodiments, check valves 196 may receive a pilot pressure via pilot pressure lines 191. In some embodiments, check valves 196 may allow free flow of fluid from control valve 198 into first fluid chambers 376, 476 (see FIG. 10), but may only allow reverse flow when a pilot pressure is provided to check valves 196 (see FIG. 11).

FIG. 10, for example, shows control valve 198 in a first state where fluid flows from pump 194, through check valves 196, and into first fluid chambers 376, 476. First fluid chambers 376, 476 may have a pressure that is greater than second fluid chambers 378, 478, thereby causing pistons 380, 480 to move from a retracted position to an extended position. Fluid in second fluid chambers 378, 478 that is displaced by such piston movement may, for example, return to reservoir 192.

Figure 11:
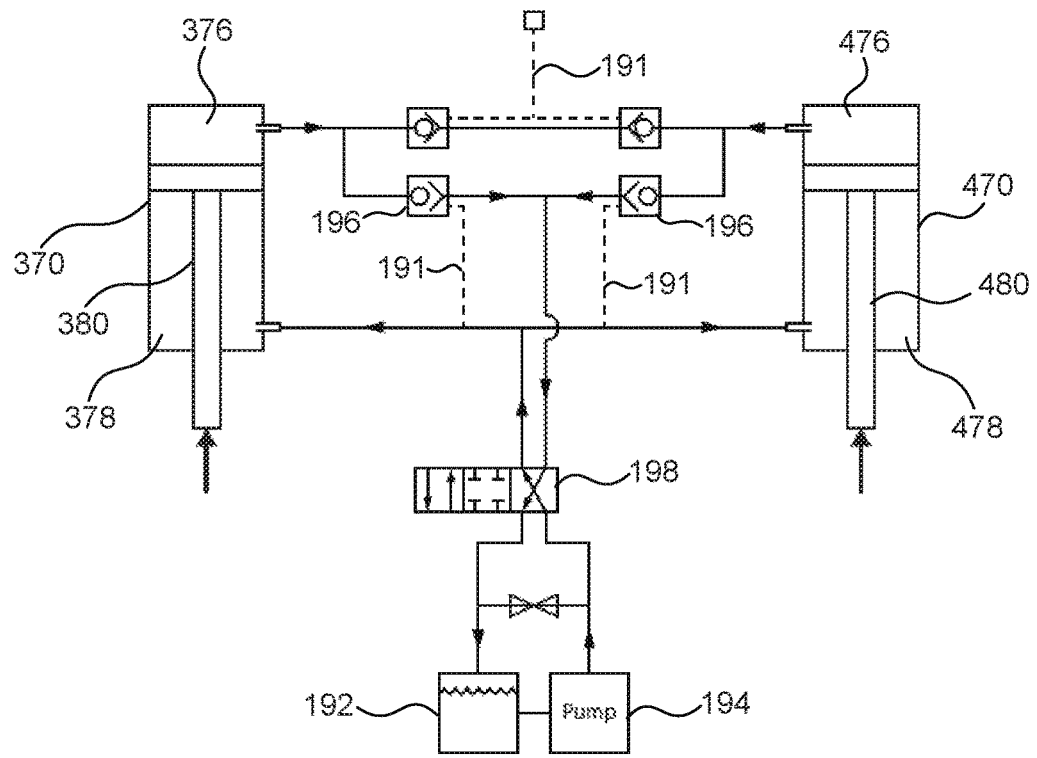
FIG. 11 is a block diagram of the example hydraulic system of FIG. 10 in a second state according to various aspects of the invention.

FIG. 11, for example, shows control valve 198 in a second state where fluid flows from pump 194 and into second fluid chambers 378, 478. Second fluid chambers 378, 478 may have a pressure that is greater than first fluid chambers 376, 476, thereby causing pistons 380, 480 to move from an extended position to a retracted position. In such a state, check valves 196 may be opened to bidirectional flow, thereby allowing fluid in first fluid chambers 376, 476 that is displaced by such piston movement to return to reservoir 192.

Figure 12:
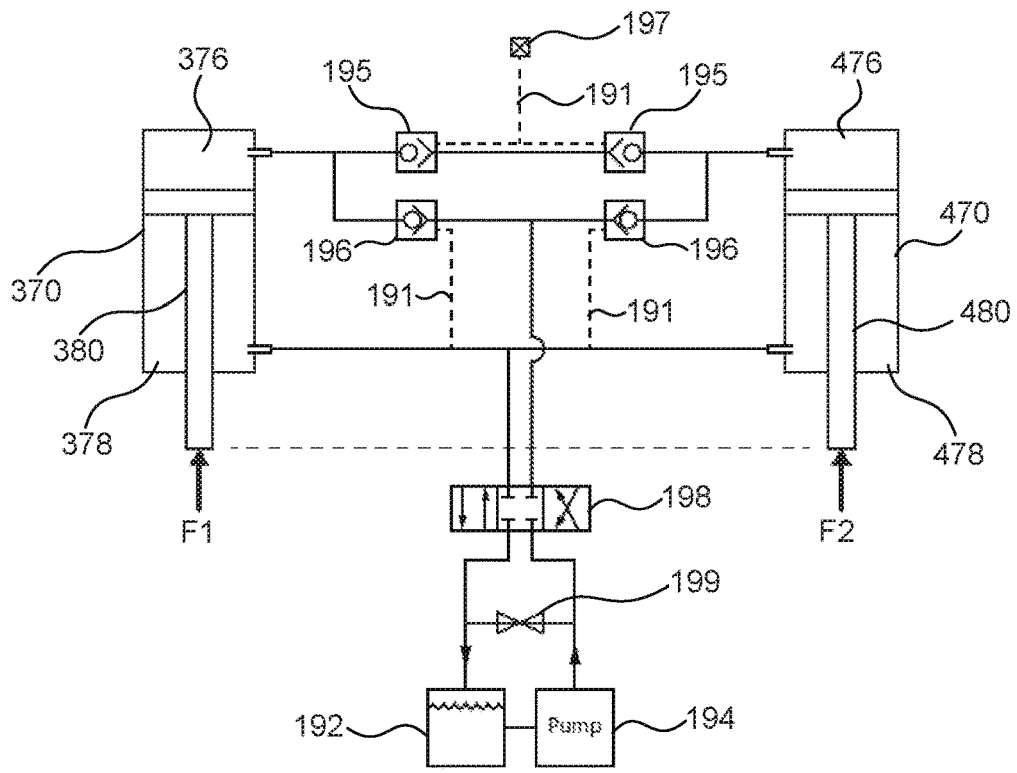
FIG. 12 is a block diagram of the example hydraulic system of FIG. 10 in a third state according to various aspects of the invention.
Figure 13:
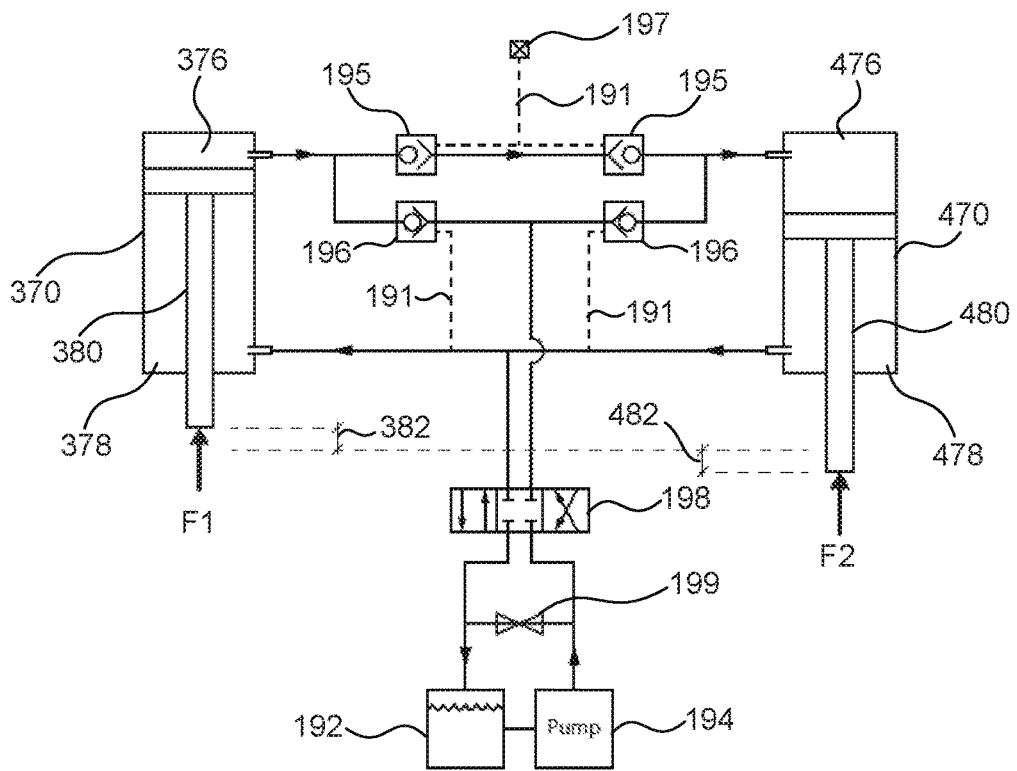
FIG. 13 is a block diagram of the example hydraulic system of FIG. 10 in a fourth state according to various aspects of the invention.
Figure 16:
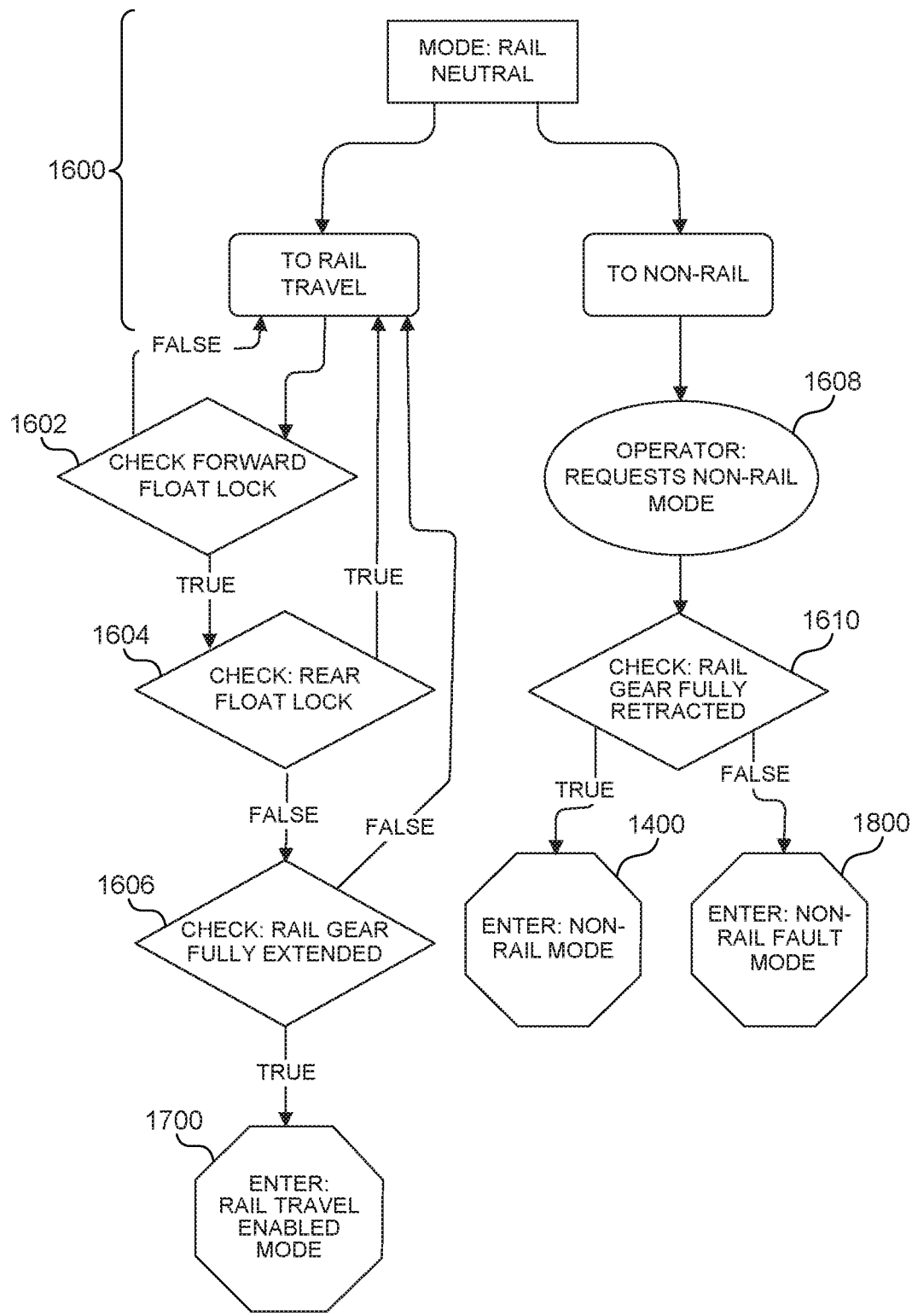
FIG. 16 is a block diagram of an example method for controlling a rail gear assembly according to various aspects of the invention.
Figure 17:
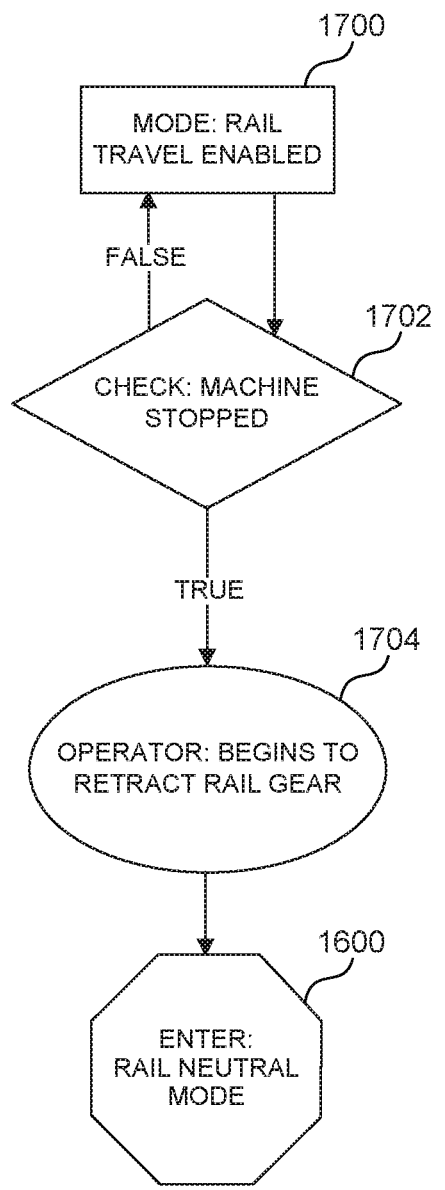
FIG. 17 is a block diagram of an example method for controlling a rail gear assembly according to various aspects of the invention.
Figure 18:
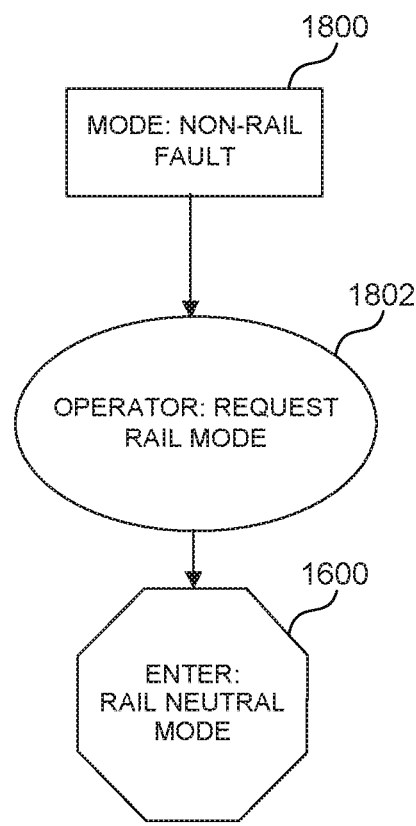
FIG. 18 is a block diagram of an example method for controlling a rail gear assembly according to various aspects of the invention.

FIG. 12, for example, shows control valve 198 in a third state where fluid from pump 194 does not flow to either of first or second wheel arm actuators 370, 470. Pressure generated by pump 194 may be relieved, for example, using a pressure relief valve 199 that may be hydraulically disposed between the outlet of pump 194 and reservoir 192. In some embodiments, one or more float valves 195 may be hydraulically disposed between first fluid chamber 376 and first fluid chamber 476. Float valve 195 may, for example, operably control the flow of fluid between first fluid chamber 376 and first fluid chamber 476. As shown in FIGS. 12 and 13, for example, in some embodiments, a pair of float valves 195 may be hydraulically disposed between first fluid chamber 376 and first fluid chamber 476. Float valves 195 may be, for example, pilot operated check valves that allow bidirectional flow when, for example, a pilot pressure is supplied to float valves 195. In some embodiments, float valves 195 may receive a pilot pressure though a float control valve 197. In some embodiments, float control valve 197 may be controlled using control unit 180. In some embodiments, float valves 195 may only allow flow between first fluid chambers 376, 476 when a pilot pressure is provided to float valves 195 (see, e.g., FIG. 13).

FIGS. 12 and 13, for example, show first and second wheel arm actuators 370, 470 in a float operation, which is to say that hydraulic fluid may flow from first fluid chamber 376 to first fluid chamber 476 and/or flow from second fluid chamber 378 to second fluid chamber 478, thereby allowing independent adjustment of the first and second wheel arms during travel. As discussed below, independent adjustment of first and second wheel arms 300, 400 may allow rail wheels 340, 440 to maintain better contact with rails during travel, thus increasing the stability of vehicle 100.

During such a float operation according to some embodiments, the total volume of fluid in first fluid chamber 376, in first fluid chamber 476, and in the fluid lines 190 between first fluid chamber 376 and first fluid chamber 476 is constant. Thus, if the volume of first fluid chamber 376 is decreased (e.g., by moving piston 380), the displaced fluid from the reduction of volume of first fluid chamber 376 causes the volume of first fluid chamber 476 to increase (e.g., by moving piston 480).

As shown in FIG. 12, for example, if a force F1 is applied to piston 380 and a second force F2 that is equal to F1 is applied to piston 480, neither of pistons 380, 480 may move because the pressure in first fluid chambers 376, 476 may be equal and no fluid may flow between the fluid chambers. However, as shown in FIG. 13, for example, if force F1 is greater than force F2, piston 380 may move toward the retracted position, thereby causing fluid to flow from first fluid chamber 376 and into first fluid chamber 476, and thereby causing piston 480 to move toward the extended position until, for example, force F1 and F2 are equalized or rotation stops 540 prevent further movement of the wheel arms relative to one another. As shown in FIG. 13, the difference in position of second end 374 before and after piston 380 moves defines a displacement distance 382. Likewise, the difference in position of second end 474 before and after piston 480 moves defines a displacement distance 482. In some embodiments, displacement distance 382 and displacement distance 482 are approximately equal, which is to say that the net adjustment between first and second actuators 370, 470—and thus the net adjustment between first and second wheel arms 300, 400—is approximately zero.

As mentioned above, in some embodiments, first and second actuators 370, 470 may be non-hydraulic actuators such as, for example, electric or mechanical actuators. Such non-hydraulic actuators may also be used to allow independent adjustment of first and second wheel arms 300, 400 during travel. For example, arm extension sensors 280 may monitor the position of first and second wheel arms 300, 400, and control unit 180 may adjust the position of one wheel arm based on the position of the other wheel arm. For example, arm extension sensor 280 may sense that first wheel arm 300 has rotated in an upward direction. Then, control unit 180 may instruct second wheel arm actuator 470 to rotate in a downward direction such that the net adjustment of first and second wheel arms 300, 400 is zero. In some embodiments, control unit 180 may adjust the position of first and second wheel arms 300, 400 automatically.

For some road-rail vehicles, during travel on a railway track, each of the rail wheels is held a fixed distance from the vehicle chassis. However, if the position of the rail wheels relative to the vehicle chassis is not adjustable, the rail wheels cannot sufficiently follow inconsistencies in the railway track (e.g. uneven, warped, or otherwise misshapen rails). Thus, such a non-adjustable configuration may allow, for example, one of the rail wheels to lift from the railway track, which may allow the vehicle to wobble and/or derail from the track. For other road-rail vehicles, the position of each pair of rail wheels relative to the vehicle chassis is adjustable, but the rail gear may not permit independent adjustment of any of the rail wheels. Again, such a configuration may allow one of the rail wheels to lift from the railway track, which may allow the vehicle to wobble and/or derail from the track. Permitting independent adjustment of all of the rail wheels of the vehicle, however, may also decrease stability of the vehicle by, for example, allowing the vehicle to wobble from side to side or to tip over. As described in further detail below, permitting independent adjustment of some of the rail wheels (e.g., on the rear of the vehicle) while holding other rail wheels (e.g., on the front of the vehicle) in a fixed position may allow the rail wheels to maintain sufficient contact with the railway track without wobbling from side to side.

As mentioned above, in some embodiments, vehicle 100 can include a first rail gear assembly 200 disposed on first end 112 of vehicle chassis 110, and a second rail gear assembly 200 disposed on second end 114 of vehicle chassis 110. In some embodiments, the first rail gear assembly 200 may allow independent adjustment of its rail wheels 340, 440 relative to vehicle chassis 110 during travel, while the second rail gear assembly 200 holds its rail wheels 340, 440 a fixed distance from vehicle chassis 110. In such a configuration, the first rail gear assembly 200 may allow its first and second wheel arms 300, 400 to move independently such that its rail wheels 340, 440 may, for example, follow inconsistencies in rails 20, thereby reducing the chance that the rail wheels of either of the rail gear assemblies 200 will lift from rails 20. Further, in such a configuration, the second rail gear assembly 200 may not allow its first and second wheel arms 300, 400 to move independently, thereby holding its rail wheels 340, 440 a fixed distance from vehicle chassis 110, and thereby reducing the amount of side-to-side wobble of vehicle 100. Thus, the first (independently-adjustable) rail gear assembly 200 and the second (non-adjustable) rail gear assembly 200, together, increase the stability of vehicle 100 during travel.

In some embodiments where vehicle 100 includes two rail gear assemblies, for example, both of the rail gear assemblies may be configured to be independently adjustable, but only one of the rail gear assemblies 200 at a time may allow independent adjustment of first and second wheel arms 300, 400 during travel. For example, if vehicle 100 is traveling such that first end 112 is the leading end of vehicle 100 relative to the direction of travel, the rail gear assembly 200 disposed on second end 114 of vehicle chassis 110 may allow independent adjustment of first and second wheel arms 300, 400, but the rail gear assembly 200 disposed on first end 112 of vehicle chassis 110 may not allow independent adjustment of first and second wheel arms 300, 400. Likewise, if vehicle 100 is traveling such that second end 114 is the leading end of vehicle 100 relative to the direction of travel, the rail gear assembly 200 disposed on first end 112 of vehicle chassis 110 may allow independent adjustment of first and second wheel arms 300, 400, but the rail gear assembly 200 disposed on second end 114 of vehicle chassis 110 may not allow independent adjustment of first and second wheel arms 300, 400. Thus, for example, in some embodiments where vehicle 100 is capable of bidirectional travel, whichever of the rail gear assembly 200 is disposed on the leading end of the vehicle 100 may not allow independent adjustment of wheel arms 300, 400 while the rail gear assembly 200 on the trailing end of the vehicle does allow independent adjustment of wheel arms 300, 400.

In some embodiments, the center of mass of vehicle 100 may be relatively centered on vehicle 100 whether first end 152 of turret 150 is positioned adjacent to first end 112 or second end 114 of vehicle chassis 110. However, if vehicle 100 were to pick up a load using boom 160, for example, the center of mass of vehicle 100 may move toward first end 152 of turret 150. In some embodiments, when the center of mass of vehicle 100 is closer to the rail gear assembly 200 that does not permit independent adjustment of first and second wheel arms 300, 400, vehicle 100 may be more stable than if the center of mass of vehicle 100 were closer to the rail gear assembly 200 that does permit independent adjustment of first and second wheel arms 300, 400. Thus, in some embodiments, which of the rail gear assemblies 200 that allows independent adjustment of the wheel arms 300, 400 may be dependent upon the position of turret 150 relative to vehicle chassis 110. For example, if turret 150 is positioned such that first end 152 of turret 150 is disposed adjacent to first end 112 of vehicle chassis 110, the rail gear assembly 200 disposed on first end 112 of vehicle chassis 110 may not allow independent adjustment of first and second wheel arms 300, 400 while the rail gear assembly 200 disposed on second end 114 of vehicle chassis 110 may allow independent adjustment of first and second wheel arms 300, 400. Likewise, if turret 150 is positioned such that first end 152 of turret 150 is disposed adjacent to second end 114 of vehicle chassis 110, the rail gear assembly 200 disposed on second end 114 of vehicle chassis 110 may not allow independent adjustment of first and second wheel arms 300, 400 while the rail gear assembly 200 disposed on first end 112 of vehicle chassis 110 may allow independent adjustment of first and second wheel arms 300, 400.

FIGS. 14-18 illustrate aspects of example methods of controlling vehicle 100 and/or rail gear assemblies 200 according to some embodiments.

At step 1400, vehicle 100 may be in a non-rail travel mode and may be, for example, disposed on non-rail wheels 140. When in non-rail travel mode, at step 1402, control unit 180 may receive electronic data that is output from arm extension sensors 280 and use the electronic data to determine if rail gear assemblies 200 are in a retracted position. If either of rail gear assemblies 200 are not in a retracted position, vehicle 100 may enter non-rail travel fault mode at step 1800, as described in further detail below.

In order to transition from non-rail travel to rail travel, for example, an operator may maneuver the vehicle such that the rail wheels are aligned above rails 20. Then, at step 1404, the operator may request using, for example, an input device of control unit 180, that vehicle 100 enter rail neutral mode.

Next, at step 1406, control unit 180 may receive electronic data that is output from swing lock sensor 158 and use the electronic data to determine whether swing lock mechanism 156 is engaged. If swing lock sensor 158 is not engaged, then vehicle 100 may enter rail fault mode at step 1500, as described in further detail below. If swing lock sensor 158 is engaged, then vehicle 100 may proceed to step 1408.

At step 1408, control unit 180 may receive electronic data that is output from boom position sensor 167 and use the electronic data to determine whether boom 160 is in a lowered position. If boom 160 is not in a lowered position, then vehicle 100 may enter rail fault mode at step 1500, as described in further detail below. If boom 160 is in a lowered position, then vehicle 100 may proceed to step 1410.

At step 1410, control unit 180 may receive electronic data that is output from telescopic extension sensor 165 and use the electronic data to determine whether boom 160 is in a retracted position. If boom 160 is not in a retracted position, then vehicle 100 may enter rail fault mode at step 1500, as described in further detail below. If boom 160 is in a retracted position, then vehicle 100 may enter rail neutral mode at step 1600.

At step 1500, vehicle 100 may be in a rail fault mode, for example where the conditions required to enter rail travel mode have not been met. When in rail fault mode, at step 1502, the operator may request using, for example, an input device of control unit 180, that vehicle 100 enter non-rail travel mode. Then, vehicle 100 may return to non-rail travel mode at step 1400.

At step 1600, vehicle 100 may be in a rail neutral mode, where vehicle 100 may either proceed to rail travel mode or to non-rail travel mode. In order to proceed to rail travel mode from rail neutral mode, at step 1602 control unit 180 may receive electronic data that is output from locking pin sensor 530 of the rail gear assembly 200 that is disposed on the front end of vehicle 100 and use the electronic data to determine if locking pin 510 is in the locked position. If locking pin 510 is not in the locked position, then vehicle 100 may return to rail neutral mode at step 1600. If locking pin 510 is in the locked position, then vehicle 100 may proceed to step 1604.

At step 1604, control unit 180 may receive electronic data that is output from locking pin sensor 530 of the rail gear assembly 200 that is disposed on the rear end of vehicle 100 and use the electronic data to determine if locking pin 510 is in the locked position. If locking pin 510 is in the locked position, then vehicle 100 may return to rail neutral mode at step 1600. If locking pin 510 is not in the locked position, then vehicle 100 may proceed to step 1606.

At step 1606, control unit 180 may receive electronic data that is output from arm extension sensors 280 and use the electronic data to determine if rail gear assemblies 200 are in an extended position. If either of rail gear assemblies 200 are not in an extended position, vehicle 100 may return to rail neutral mode at step 1600. If both rail gear assemblies 200 are in an extended position, vehicle 100 may enter rail travel mode at step 1700.

In order to proceed to non-rail travel mode from rail neutral mode, at step 1608, the operator may request using, for example, an input device of control unit 180, that vehicle 100 enter non-rail travel mode. Then, at step 1610 control unit 180 may receive electronic data that is output from arm extension sensors 280 and use the electronic data to determine if rail gear assemblies 200 are in a retracted position. If either of rail gear assemblies 200 are not in a retracted position, vehicle 100 may enter non-rail fault mode at step 1800. If both of rail gear assemblies 200 are in a retracted position, vehicle 100 may enter non-rail travel mode at step 1400.

At step 1700, vehicle 100 may be in a rail travel mode and may be disposed on rail wheels 340, 440. When in rail travel mode, at step 1702, control unit 180 may receive electronic data that is output from vehicle speed sensor 182 and use the electronic data to determine if vehicle 100 is stopped. If vehicle 100 is not stopped, then vehicle 100 may return to rail travel mode at step 1700. If vehicle 100 is stopped then, then vehicle 100 may proceed to step 1704.

At step 1704, an operator may request using, for example, an input device of control unit 180, that rail gear assemblies 200 retract. Then, vehicle 100 may enter rail neutral mode at step 1600.

At step 1800, vehicle 100 may be in a non-rail travel fault mode, where the conditions required to enter non-rail travel mode have not been met. When in rail fault mode, at step 1802, the operator may request using, for example, an input device of control unit 180, that vehicle 100 enter rail neutral mode. Then, vehicle 100 may enter rail neutral mode at step 1600.

Figure 19:
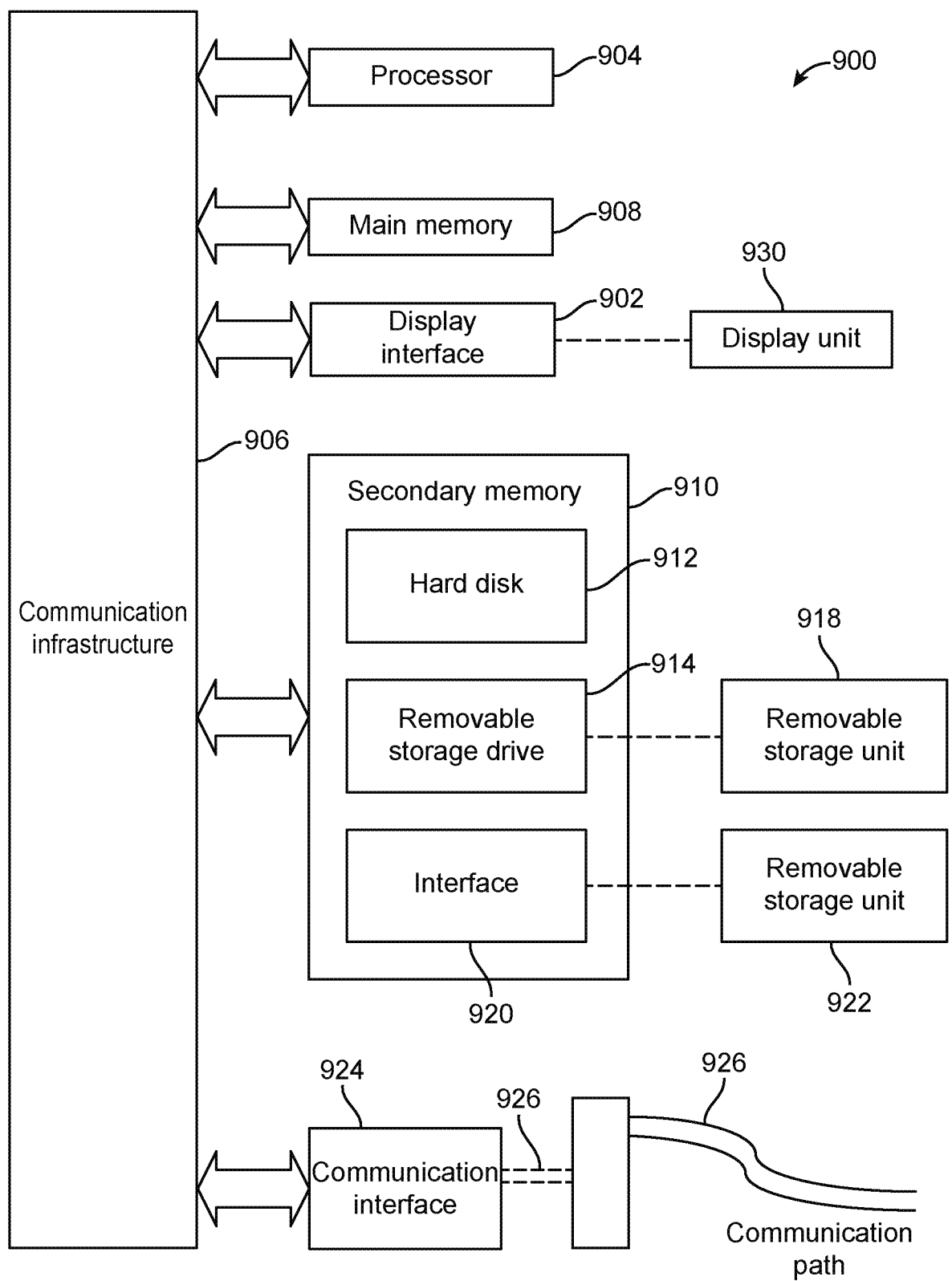
FIG. 19 is a schematic block diagram of an exemplary computer system in which embodiments may be implemented.

FIG. 19 illustrates an exemplary computer system 900 in which embodiments, or portions thereof, may be implemented as computer-readable code. For example, processing of operator instructions or control of certain vehicle operations may be implemented in computer system 900 using hardware, software, firmware, tangible computer readable media having instructions stored thereon, or a combination thereof and may be implemented in one or more computer systems or other processing systems. Control units discussed herein may be computer systems having all or some of the components of computer system 900 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention(s) may be implemented in terms of this example computer system 900. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme.

Computer system 900 also includes a main memory 908, for example, random access memory (RAM), and may also include a secondary memory 910. Secondary memory 910 may include, for example, a hard disk drive 912, or removable storage drive 914. Removable storage drive 914 may include a floppy disk drive, a magnetic tape drive, an optical disk drive, a flash memory, or the like. The removable storage drive 914 reads from and/or writes to a removable storage unit 918 in a well-known manner. Removable storage unit 918 may include a floppy disk, magnetic tape, optical disk, a universal serial bus (USB) drive, etc. which is read by and written to by removable storage drive 914. As will be appreciated by persons skilled in the relevant art, removable storage unit 918 includes a computer usable storage medium having stored therein computer software and/or data.

Computer system 900 (optionally) includes a display interface 902 (which can include input and output devices such as keyboards, mice, etc.) that forwards graphics, text, and other data from communication infrastructure 906 (or from a frame buffer not shown) for display on display unit 930.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communication interface 924. Communication interface 924 allows software and data to be transferred between computer system 900 and external devices. Communication interface 924 may include a modem, a network interface (such as an Ethernet card), a communication port, a PCMCIA slot and card, or the like. Software and data transferred via communication interface 924 may be in the form of signals, which may be electronic, electromagnetic, optical, or other signals capable of being received by communication interface 924. These signals may be provided to communication interface 924 via a communication path 926. Communication path 926 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 918, removable storage unit 922, and a hard disk installed in hard disk drive 912. Computer program medium and computer usable medium may also refer to memories, such as main memory 908 and secondary memory 910, which may be memory semiconductors (e.g. DRAMs, etc.).

Computer programs (also called computer control logic) are stored in main memory 908 and/or secondary memory 910. Computer programs may also be received via communication interface 924. Such computer programs, when executed, enable computer system 900 to implement the embodiments as discussed herein. In particular, the computer programs, when executed, enable processor device 904 to implement the processes of the embodiments discussed here. Accordingly, such computer programs represent controllers of the computer system 900. Where the embodiments are implemented using software, the software may be stored in a computer program product and loaded into computer system 900 using removable storage drive 914, interface 920, and hard disk drive 912, or communication interface 924.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The attached Appendix includes additional materials related to the rail gear assembly according to the present invention. The attached Appendix is incorporated herein in its entirety.

It is to be appreciated that the Detailed Description section, and not the Summary and Abstract sections, is intended to be used to interpret the claims. The Summary and Abstract sections may set forth one or more but not all exemplary embodiments of the present embodiments as contemplated by the inventor(s), and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A rail gear assembly, comprising:
    a base;
    a first wheel arm having a first end pivotally coupled to the base at a first arm connection and a second end rotatably connected to a first wheel by a first axle;
    a second wheel arm having a first end pivotally coupled to the base at a second arm connection and a second end rotatably connected to a second wheel by a second axle, the second axle being independent of the first axle;
    a first wheel arm actuator having a first end coupled to the base and a second end coupled to the first wheel arm such that the first wheel arm actuator moves the first wheel arm between a retracted position and an extended position; and
    a second wheel arm actuator having a first end coupled to the base and a second end coupled to the second wheel arm such that the second wheel arm actuator moves the second wheel arm between a retracted position and an extended position;
    wherein the first wheel arm actuator and the second wheel arm actuator permit adjustment of the first wheel arm and the second wheel arm in their respective extended positions such that a net adjustment of the first wheel arm and the second wheel arm with respect to the base is approximately zero.

2. The rail gear assembly of claim 1, wherein the first wheel arm actuator is fluidly connected to the second wheel arm actuator such that the adjustment of the first wheel arm and the second wheel arm in their respective extended positions is accomplished by fluid transfer between the first wheel arm actuator and the second wheel arm actuator.

3. The rail gear assembly of claim 1, wherein the first wheel arm further comprises a movable locking pin extending into a locking pin receptacle on the second wheel arm.

4. The rail gear assembly of claim 1, further comprising a hydraulic motor to drive the first wheel.

5. The rail gear assembly of claim 1, further comprising a rail gauge member having a first end pivotally coupled to the first wheel arm and a second end pivotally coupled to the second wheel arm to maintain a gauge between the first wheel and the second wheel.

6. A method of controlling a rail gear assembly, comprising:
　lowering a first wheel arm from a retracted position to an extended position, the first wheel arm having a first end pivotally coupled to a base at a first arm connection and a second end rotatably connected to a first wheel by a first axle,
　wherein a first wheel arm actuator having a first end coupled to the base and a second end coupled to the first wheel arm lowers the first wheel arm from the retracted position to the extended position;
　lowering a second wheel arm from a retracted position to an extended position, the second wheel arm having a first end pivotally coupled to the base at a second arm connection and a second end rotatably connected to a second wheel by a second axle, the second axle being independent of the first axle,
　wherein a second wheel arm actuator having a first end coupled to the base and a second end coupled to the second wheel arm lowers the second wheel arm from the retracted position to the extended position, and
　wherein the first wheel arm and the second wheel arm move from their respective retracted positions to their respective extended positions simultaneously; and
　allowing adjustment of the first wheel arm and the second wheel arm in their respective extended positions such that a net adjustment of the first wheel arm and the second wheel arm with respect to the base is approximately zero.

7. The method of claim 6, wherein the first wheel arm actuator is fluidly connected to the second wheel arm actuator such that the adjustment of the first wheel arm and the second wheel arm in their respective extended positions is accomplished by fluid transfer between the first wheel arm actuator and the second wheel arm actuator.

8. The method of claim 6, wherein the adjustment of the first wheel arm and the second wheel arm is accomplished automatically with an adjustment control system.

9. The method of claim 6, further comprising verifying that the first and second wheel arms are in the extended position.

10. The method of claim 6, wherein the first wheel arm further comprises a movable locking pin that extends into a locking pin receptacle on the second wheel arm when in a locked position.

11. The method of claim 10, further comprising moving the movable locking pin from the locked position to an unlocked position, wherein in the unlocked position the movable locking pin is removed from the locking pin receptacle.

12. The method of claim 11, further comprising verifying that the locking pin is in the unlocked position.

13. The method of claim 6, wherein a rail gauge member having a first end pivotally coupled to the first wheel arm and a second end pivotally coupled to the second wheel arm maintains a gauge between the first wheel and the second wheel.

* * * * *